(12) United States Patent
Arashi et al.

(10) Patent No.: US 7,517,823 B2
(45) Date of Patent: Apr. 14, 2009

(54) DIELECTRIC PORCELAIN COMPOSITION AND METHOD FOR PRODUCTION THEREOF

(75) Inventors: Tomohiro Arashi, Tokyo (JP); Yasuharu Miyauchi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/573,282

(22) PCT Filed: Sep. 29, 2005

(86) PCT No.: PCT/JP2005/018504

§ 371 (c)(1),
(2), (4) Date: Feb. 6, 2007

(87) PCT Pub. No.: WO2006/036021

PCT Pub. Date: Apr. 6, 2006

(65) Prior Publication Data

US 2007/0213202 A1 Sep. 13, 2007

(30) Foreign Application Priority Data

Sep. 30, 2004 (JP) ............................. 2004-286651
Sep. 30, 2004 (JP) ............................. 2004-286674
Mar. 18, 2005 (JP) ............................. 2005-079368

(51) Int. Cl.
*C04B 35/468* (2006.01)
(52) U.S. Cl. .................... 501/138; 501/122; 501/139
(58) Field of Classification Search ................ 501/122, 501/138, 139
See application file for complete search history.

(56) References Cited

U.S. PATENT DOCUMENTS

| 6,184,165 | B1 * | 2/2001 | Kawata ...................... 501/32 |
| 6,340,649 | B1 * | 1/2002 | Kawata et al. .............. 501/138 |
| 6,458,734 | B1 * | 10/2002 | Sugimoto et al. ........... 501/139 |
| 6,602,616 | B2 * | 8/2003 | Sugimoto et al. ........... 428/688 |
| 6,740,614 | B2 * | 5/2004 | Kim et al. ................... 501/139 |
| 2002/0183190 | A1 * | 12/2002 | Masumura et al. .......... 501/139 |
| 2005/0095464 | A1 * | 5/2005 | Lee et al. .................... 428/697 |

FOREIGN PATENT DOCUMENTS

| JP | 2001 031468 | 2/2001 |
| JP | 2002 104870 | 4/2002 |
| JP | 2002 167274 | 6/2002 |

* cited by examiner

*Primary Examiner*—Karl E Group
(74) *Attorney, Agent, or Firm*—Oblon, Spivak, McClelland, Maier & Neustadt, P.C.

(57) ABSTRACT

A dielectric porcelain composition here contains as main components BaO, $Nd_2O_3$, $TiO_2$, MgO and $SiO_2$ at the given ratios and as subordinate components ZnO, $B_2O_3$ and CuO at given ratios, so that it can have a low-temperature sintering capability stable and reliable enough to permit a conductor formed of Ag, an alloy containing Ag as a main component or the like to be used as an internal conductor. It is also possible to obtain a dielectric porcelain composition that has limited resonance frequency changes with temperature changes and a specific dielectric constant lower than that of a BaO-rare earth oxide-$TiO_2$ base dielectric porcelain composition, and so is suitable for multilayer type device formation.

18 Claims, 3 Drawing Sheets

DIELECTRIC PORCELAIN COMPOSITION AND METHOD FOR PRODUCTION THEREOF

TECHNICAL ART

The present invention relates to a dielectric porcelain composition having low-temperature sintering capability enough to allow a conductor formed of Ag, an alloy composed mainly of Ag or the like to be used as an internal conductor.

BACKGROUND ART

In recent years, mobile communications fields represented by car phones and cell phones have seen some drastic growth. And then, high-frequency bands referred to as the so-called quasi-microwaves of the order of several hundred MHz to a few GHz are used for those mobile communications. In electronic devices used with mobile communications equipment, like resonators, filters and capacitors, too, high-frequency characteristics are thus of importance.

Important factors for the recent widespread use of mobile communications are, to say nothing of more sophisticated services, size and cost reductions of communications equipment. This in turn leads to the need of reducing the size and cost of associated high-frequency devices. For instance, to achieve size reductions in terms of resonator material, there are dielectric porcelain compositions required, which have a high specific dielectric constant and limited dielectric losses at the frequency used, and which are reduced in changes in the temperature characteristics of resonance frequency.

For materials for high-frequency devices that meet such demands, there have been BaO-rare earth oxide-$TiO_2$ base dielectric porcelain compositions known so far in the art.

Now, to downsize high-frequency devices, there are surface mount devices (SMDs for short) going mainstream, which each have conductors such as electrodes and wirings. In what follows, a conductor such as an electrode or wiring built in a high-frequency device will be called an "internal conductor".

To form conductors such as electrodes or wirings in the device, it is required that a dielectric porcelain composition be co-fired with them. Of a BaO-rare earth oxide-$TiO_2$ base dielectric porcelain composition, however, the firing temperature is relatively high, say, 1,300 to 1,400° C., and materials for conductors such as electrodes or wirings, used in combination with it, have been limited to noble metals such as palladium (Pd) and platinum (Pt) that can stand up to high temperatures.

Because those noble metals cost much, however, it is desired for the purpose of making devices less expensive that low-resistance yet less expensive conductors such as Ag or Cu can be used as the internal conductors.

To this end, there has been a technique proposed, in which subordinate components such as $B_2O_3$ are added to a material composed mainly of a BaO-rare earth oxide-$TiO_2$ system. With that technique, a dielectric porcelain composition can be fired at a temperature lower than the melting point of a conductor such as Ag or Cu, so that the conductor such as Ag or Cu can be co-fired in the form of an internal conductor (see, for instance, JP-A's 2001-31468 and 6-40767).

To achieve further size reductions of devices, on the other hand, there has been a multilayer type device of high performance proposed, in which a dielectric porcelain composition having a high specific dielectric constant is joined to a dielectric porcelain composition having a low dielectric constant, thereby forming a plurality of high-frequency devices as one integral piece (see, for instance, JP-A 9-139320).

However, if, in forming such a multilayer type device, the dielectric porcelain composition having a high specific dielectric constant differs in properties from that having a low dielectric constant, defects will occur at an interface of both upon firing, because the shrinkage behaviors and linear thermal coefficients of both do not match.

In view of such considerations, it is desired that for multilayer type device formation, the dielectric porcelain composition having a high specific dielectric constant and the dielectric porcelain composition having a low specific dielectric constant be basically made up of the same or a similar material having much the same physical properties.

However, the BaO-rare earth oxide-$TiO_2$ base dielectric porcelain composition well fit for the material of a small high-frequency device has a much higher specific dielectric constant, as set forth in the aforesaid patent publication 1, and even with simple addition of subordinate components, it would be difficult to produce a BaO-rare earth oxide-$TiO_2$ base dielectric porcelain composition that has a low specific dielectric constant as demanded for a composite arrangement (multilayer type device).

To fabricate a multilayer type device having limited power losses for high-frequency purposes, there are also growing expectations of a BaO-rare earth oxide-$TiO_2$ base dielectric porcelain composition that is much more improved in terms of dielectric losses than could be possible with the prior art.

DISCLOSURE OF THE INVENTION

To provide solutions to many such problems with the prior art, the invention according to the first group of this application, the invention according to the second group and the invention according to the third group have been made.

INVENTION OF THE FIRST GROUP

Therefore, one object of the invention according to the first group is to provide a dielectric porcelain composition and its production process, which allow even a composition system composed mainly of BaO, a rare earth oxide and $TiO_2$ to have more stable and reliable low-temperature sintering capability, thereby ensuring that a conductor formed of Ag, an alloy containing Ag as a main component or the like can be used as an internal conductor.

Another object of the invention according to the first group of this application is to provide a dielectric porcelain composition that is reduced in dielectric losses and resonance frequency changes with temperature changes, and has a specific dielectric constant lower than that of a BaO-rare earth oxide-$TiO_2$ base dielectric porcelain composition as well as its production process.

To accomplish those objects, the invention according to the first group of this application provides a dielectric porcelain composition that contains as a main component composition a component represented by a composition formula $\{\alpha(xBaO \cdot yNd_2O_3 \cdot zTiO_2) + \beta(2MgO \cdot SiO_2)\}$ wherein x, y and z indicative of a molar ratio of BaO, $Nd_2O_3$, and $TiO_2$ are in the ranges of $9 \text{ (mol \%)} \leq x \leq 22 \text{ (mol \%)}$ $9 \text{ (mol \%)} \leq y \leq 29 \text{ (mol \%)}$ $61 \text{ (mol \%)} \leq z \leq 74 \text{ (mol \%)}$ and have a relation of x+y+z=100 (mol %), and α and β indicative of a volume ratio of each component in said main component composition are in the ranges of $$5 \text{ (vol \%)} \leq \alpha < 85 \text{ (vol \%)}$$

$$15 \text{ (vol \%)} < \beta \leq 95 \text{ (vol \%)}$$

and have a relation of α+β=100 (vol %), wherein a zinc oxide, a boron oxide and a copper oxide are contained as subordinate components relative to said main component composition, and when said subordinate components are represented by $aZnO$, $bB_2O_3$ and $cCuO$, a, b and c indicative of a weight ratio of each subordinate component relative to said main component composition have relations of $$0.05 \text{ (wt \%)} < a \leq 17.0 \text{ (wt \%)}$$

$$0.05 \text{ (wt \%)} < b \leq 17.0 \text{ (wt \%)}$$

$$0.05 \text{ (wt \%)} < c \leq 14.0 \text{ (wt \%)}$$

In a preferable embodiment of the invention according to the first group, the dielectric porcelain composition contains a forsterite ($2MgO.SiO_2$) crystal therein.

In a preferable embodiment of the invention according to the first group, the dielectric porcelain composition has such a physical property as represented by a specific dielectric constant of up to 50.

The invention according to the first group of this application also provides a dielectric porcelain composition production process in which a barium-containing raw material, a neodymium-containing raw material, a titanium-containing raw material, a magnesium-containing raw material, a silicon-containing raw material, a zinc-containing raw material, a boron-containing raw material and a copper-containing raw material are fired to produce $BaO$—$Nd_2O_3$—$TiO_2$—$MgO$—$SiO_2$—$ZnO$—$B_2O_3$—$CuO$, wherein forsterite ($2MgO.SiO_2$) powders are used as said magnesium-containing raw material and said silicon-containing raw material.

INVENTION OF THE SECOND GROUP

One object of the invention according to the second group of this application is to provide a dielectric porcelain composition and its production process, which allow even a composition system composed mainly of BaO, a rare earth oxide and $TiO_2$ to have more stable and reliable low-temperature sintering capability, thereby ensuring that a conductor formed of Ag, an alloy containing Ag as a main component or the like can be used as an internal conductor.

Another object of the invention according to the second group of this application is to provide a dielectric porcelain composition that is reduced in resonance frequency changes with temperature changes, has a specific dielectric constant lower than that of a BaO-rare earth oxide-$TiO_2$ base dielectric porcelain composition, and is improved in terms of dielectric losses as well as its production process.

To accomplish those objects, the invention according to the second group of this application provides a dielectric porcelain composition that contains as a main component composition a component represented by a composition formula $\{\alpha(xBaO.yNd_2O_3.zTiO_2)+\beta(2MgO.SiO_2)\}$ wherein x, y and z indicative of a molar ratio of BaO, $Nd_2O_3$, and $TiO_2$ are in the ranges of $$9 \text{ (mol \%)} \leq x \leq 22 \text{ (mol \%)}$$

$$9 \text{ (mol \%)} \leq y \leq 29 \text{ (mol \%)}$$

$$61 \text{ (mol \%)} \leq z \leq 74 \text{ (mol \%)}$$

and have a relation of x+y+z=100 (mol %), and α and β indicative of a volume ratio of each component in said main component composition are in the ranges of $$15 \text{ (vol \%)} \leq \alpha \leq 85 \text{ (vol \%)}$$

$$25 \text{ (vol \%)} \leq \beta \leq 85 \text{ (vol \%)}$$

and have a relation of α+β=100 (vol %), wherein a zinc oxide, a boron oxide, a copper oxide and a manganese oxide are contained as subordinate components relative to said main component composition, and when said subordinate components are represented by $aZnO$, $bB_2O_3$, $cCuO$ and $dMnO$, a, b, c and d indicative of a weight ratio of each subordinate component relative to said main component composition have relations of $$0.1 \text{ (wt \%)} \leq a \leq 12.0 \text{ (wt \%)}$$

$$0.1 \text{ (wt \%)} \leq b \leq 12.0 \text{ (wt \%)}$$

$$0.1 \text{ (wt \%)} \leq c \leq 9.0 \text{ (wt \%)}$$

$$0.01 \text{ (wt \%)} \leq d \leq 6.5 \text{ (wt \%)}$$

In a preferable embodiment of the invention according to the second group, the dielectric porcelain composition contains a forsterite ($2MgO.SiO_2$) crystal therein.

In a preferable embodiment of the invention according to the second group, the dielectric porcelain composition has such a physical property as represented by a specific dielectric constant of up to 50.

The invention according to the second group of this application also provides a dielectric porcelain composition production process in which a barium-containing raw material, a neodymium-containing raw material, a titanium-containing raw material, a magnesium-containing raw material, a silicon-containing raw material, a zinc-containing raw material, a boron-containing raw material, a copper-containing raw material and a manganese-containing raw material are fired to produce $BaO$—$Nd_2O_3$—$TiO_2$—$MgO$—$SiO_2$—$ZnO$—$B_2O_3$—$CuO$—$MnO$, wherein forsterite ($2MgO.SiO_2$) powders are used as said magnesium-containing raw material and said silicon-containing raw material.

INVENTION OF THE THIRD GROUP

One object of the invention according to the third group of this application is to provide a dielectric porcelain composition and its production process, which allow even a composition system composed mainly of BaO, a rare earth oxide and $TiO_2$ to have more stable and reliable low-temperature sintering capability, thereby ensuring that a conductor formed of Ag, an alloy containing Ag as a main component or the like can be used as an internal conductor.

Another object of the invention according to the third group of this application is to provide a dielectric porcelain composition that is reduced in resonance frequency changes with temperature changes, and has a specific dielectric constant lower than that of a BaO-rare earth oxide-$TiO_2$ base dielectric porcelain composition as well as its production process.

To accomplish those objects, the invention according to the third group of this application provides a dielectric porcelain composition that contains as a main component composition a component represented by a composition formula $\{\alpha(x\text{BaO}\cdot y\text{Nd}_2\text{O}_3\cdot z\text{TiO}_2)+\beta(2\text{MgO}\cdot\text{SiO}_2)\}$ wherein x, y and z indicative of a molar ratio of BaO, $\text{Nd}_2\text{O}_3$, and $\text{TiO}_2$ are in the ranges of $$9 \text{ (mol \%)} \leq x \leq 22 \text{ (mol \%)}$$

$$9 \text{ (mol \%)} \leq y \leq 29 \text{ (mol \%)}$$

$$61 \text{ (mol \%)} \leq z \leq 74 \text{ (mol \%)}$$

and have a relation of x+y+z=100 (mol %), and α and β indicative of a volume ratio of each component in said main component composition are in the ranges of $$15 \text{ (vol \%)} \leq \alpha \leq 75 \text{ (vol \%)}$$

$$25 \text{ (vol \%)} \leq \beta \leq 85 \text{ (vol \%)}$$

and have a relation of α+β=100 (vol %), wherein a zinc oxide, a boron oxide, a copper oxide and an alkaline earth metal oxide are contained as subordinate components relative to said main component composition, and when said subordinate components are represented by aZnO, $b\text{B}_2\text{O}_3$, cCuO and dRO (R is an alkaline earth metal), a, b, c and d indicative of a weight ratio of each subordinate component relative to said main component have relations of $$0.1 \text{ (wt \%)} \leq a \leq 12.0 \text{ (wt \%)}$$

$$0.1 \text{ (wt \%)} \leq b \leq 12.0 \text{ (wt \%)}$$

$$0.1 \text{ (wt \%)} \leq c \leq 9.0 \text{ (wt \%)}$$

$$0.2 \text{ (wt \%)} \leq d \leq 5.0 \text{ (wt \%)}$$

In a preferable embodiment of the dielectric porcelain composition according to the invention of the third group, the alkaline earth metal R is at least one selected from the group consisting of Ba, Sr and Ca.

In a preferable embodiment of the invention according to the third group, the dielectric porcelain composition contains a forsterite ($2\text{MgO}\cdot\text{SiO}_2$) crystal therein.

In a preferable embodiment of the invention according to the third group, the dielectric porcelain composition has such a physical property as represented by a firing temperature of up to 870° C.

In a preferable embodiment of the invention according to the third group, the dielectric porcelain composition has such a physical property as represented by a specific dielectric constant of up to 50.

In a preferable embodiment of the invention according to the third group, the dielectric porcelain composition has such physical properties as represented by a specific dielectric constant of 20 to 30 and a Q·f value of at least 4,000 GHz.

The invention according to the third group of this application also provides a dielectric porcelain composition production process in which a barium-containing raw material, a neodymium-containing raw material, a titanium-containing raw material, a magnesium-containing raw material, a silicon-containing raw material, a zinc-containing raw material, a boron-containing raw material, a copper-containing raw material and an alkaline earth metal-containing raw material are fired to produce a $\text{BaO}$—$\text{Nd}_2\text{O}_3$—$\text{TiO}_2$—$\text{MgO}$—$\text{SiO}_2$—$\text{ZnO}$—$\text{B}_2\text{O}_3$—$\text{CuO}$—RO (R is an alkaline earth metal) base dielectric porcelain composition, wherein forsterite ($2\text{MgO}\cdot\text{SiO}_2$) powders are used as said magnesium-containing raw material and said silicon-containing raw material.

BEST MODE FOR CARRYING OUT THE INVENTION

Figure 1:
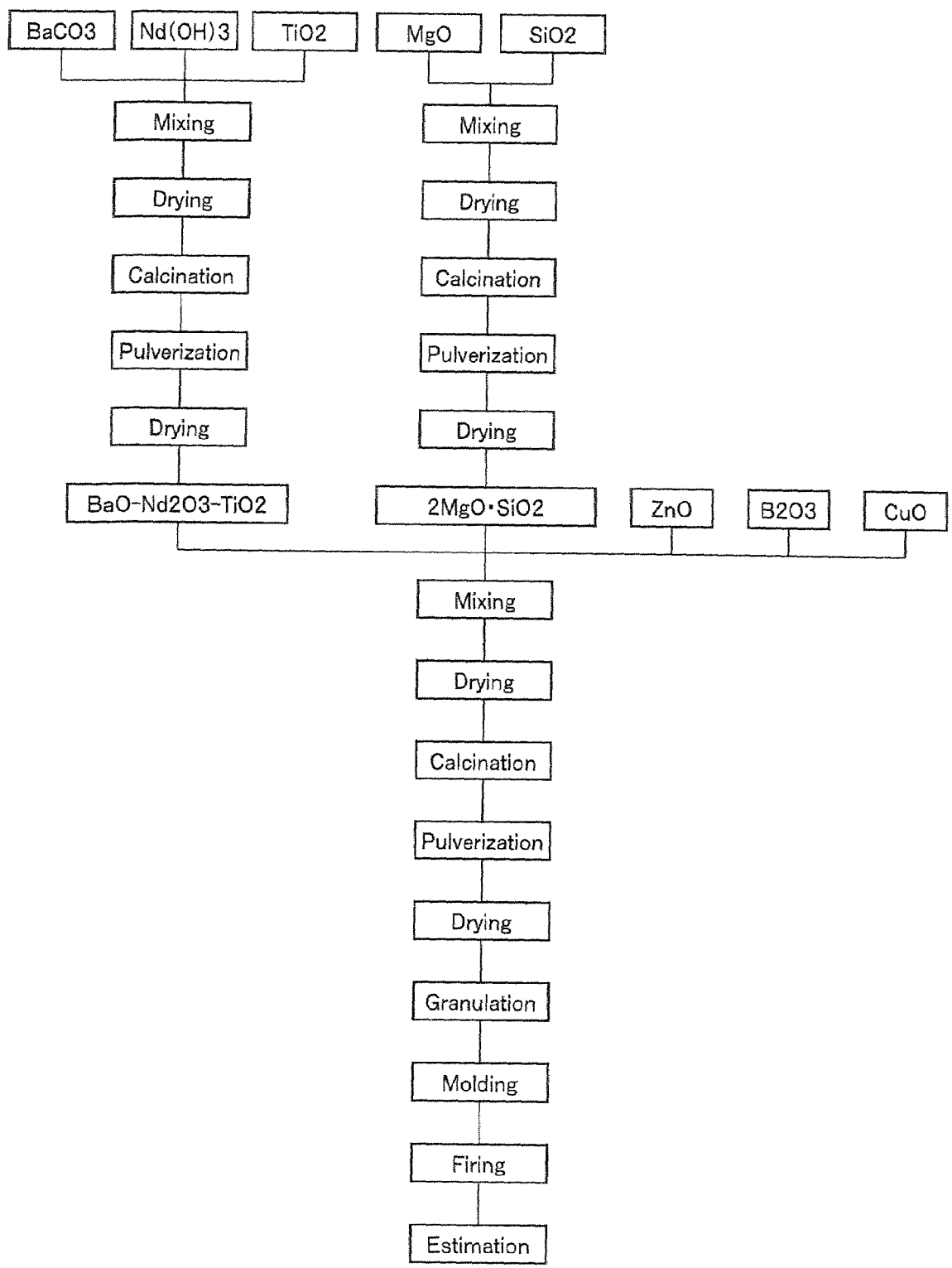
FIG. 1 is illustrative of the process steps for producing the dielectric porcelain composition of the invention according to the first group of this application.

Embodiments of the present invention are now explained at great length.

(1) Explanation of the Invention According to the First Group of This Application The best mode for carrying out the invention according to the first group of this application is now explained.

Explanation of the Dielectric Porcelain Composition According to the First Group The dielectric porcelain composition of the present invention comprises a main component composition represented by a composition formula $\{\alpha(x\text{BaO}\cdot y\text{Nd}_2\text{O}_3\cdot z\text{TiO}_2)+\beta(2\text{MgO}\cdot\text{SiO}_2)\}$.

Further, the dielectric porcelain composition of the present invention comprises given amounts of a zinc oxide, a boron oxide and a copper oxide as subordinate components relative to that main component composition.

In what follows, the main component composition, and the subordinate component composition of the dielectric porcelain composition according to the present invention are explained in further details. First of all, the main component composition is explained.

Explanation of the Main Component Composition

As already noted, the dielectric porcelain composition of the present invention contains the main component composition represented by the composition formula $\{\alpha(x\text{BaO}\cdot y\text{Nd}_2\text{O}_3\cdot z\text{TiO}_2)+\beta(2\text{MgO}\cdot\text{SiO}_2)\}$, wherein x, y and z indicative of the molar ratios (mol %) of BaO, $\text{Nd}_2\text{O}_3$, and $\text{TiO}_2$ are in the ranges of $$9 \text{ (mol \%)} \leq x \leq 22 \text{ (mol \%)}$$

$$9 \text{ (mol \%)} \leq y \leq 29 \text{ (mol \%)}$$

$$61 \text{ (mol \%)} \leq z \leq 74 \text{ (mol \%)}$$

and have a relation of x+y+z =100 (mol %).

Further, α and β indicative of the volume ratio (vol %) of each component in that main component composition are in the ranges of $$5 \text{ (vol \%)} \leq \alpha < 85 \text{ (vol \%)}$$

$$15 \text{ (vol \%)} < \beta \leq 95 \text{ (vol \%)}$$

and have a relation of α+β=100 (vol %).

It is required that the proportion x of BaO contained be within the aforesaid range, that is, 9 (mol %)≤x≤22 (mol %). Preferably, 10 (mol %)≤x≤19 (mol %), and more preferably, 14 (mol %)≤x≤19 (mol %).

As the proportion of BaO contained does not reach 9 (mol %), there are dielectric losses tending to grow large and the Q·f value tending to go down, resulting in an increase in the power loss of a high-frequency device. As the proportion of BaO contained exceeds 22 (mol %), on the other hand, low-temperature sintering capability tends to become worse, resulting in inability to form any dielectric porcelain composition. Otherwise, the Q·f value will go further down, leading to inconvenience that the power loss of the high-frequency device grows large.

It is required that the proportion of $Nd_2O_3$ contained be within the aforesaid range, that is, 9 (mol %)≦y≦29 (mol %). Preferably, 9 (mol %)≦y≦22 (mol %), and more preferably, 12 (mol %)≦y≦17 (mol %).

As the proportion of $Nd_2O_3$ contained does not reach 9 (mol %), there are dielectric losses tending to grow large and the Q·f value tending to go down, resulting in an increase in the power loss of a high-frequency device. As the proportion of $Nd_2O_3$ contained exceeds 29 (mol %), on the other hand, there are dielectric losses tending to grow large and the Q·f value tending to go down, and the temperature coefficient of resonance frequency (τ f) tends to grow large in a negative direction as well. Consequently, the power loss of the high-frequency device will grow large, and the resonance frequency of the high-frequency device will be likely to fluctuate with temperatures.

It is required that the proportion of $TiO_2$ contained be within the aforesaid range, that is, 61 (mol %)≦z≦74 (mol %). Preferably, 61.5 (mol %)≦z≦74 (mol %), and more preferably, 65 (mol %)≦z≦71 (mol %).

As the proportion of $TiO_2$ contained does not reach 61 (mol %), there are dielectric losses tending to grow large and the Q·f value tending to go down, and the temperature coefficient of resonance frequency (τ f) tends to grow large in a negative direction as well. Consequently, the power loss of a high-frequency device will grow large, and the resonance frequency of the high-frequency device will be likely to fluctuate with temperatures. As the proportion of $TiO_2$ contained exceeds 74 (mol %), on the other hand, low-temperature sintering capability becomes worse, which will tend to result in inability to form any dielectric porcelain composition.

In the composition formula for the aforesaid main component composition, α and β are indicative of the volume ratios of (1) BaO, $Nd_2O_3$ and $TiO_2$ and (2) MgO and $SiO_2$.

As already noted, α and β are in the ranges of 5 (vol %)≦α<85 (vol %)

15 (vol %)<β≦95 (vol %)

and have a relation of α+β=100 (vol %). Preferably, 15 (vol %)≦α≦75 (vol %) and 25 (vol %)≦β≦85 (vol %); more preferably, 25 (vol %)≦α≦65 (vol %) and 35 (vol %)≦β≦75 (vol %); and even more preferably, 35 (vol %)≦α≦55 (vol %) and 45 (vol %)≦β≦65 (vol %).

As the value of α exceeds 85 (vol %) and the value of β does not reach 15 (vol %), the specific dielectric constant ∈r of the dielectric porcelain composition tends to grow large, and the temperature coefficient of resonance frequency (t f) tends to grow large in a positive direction. The increase in the specific dielectric constant ∈r will render it difficult to enhance the characteristics of a multilayer type device joined to the BaO-rare earth oxide-$TiO_2$ base dielectric porcelain composition, and cause the temperature coefficient of resonance frequency (τ f) to grow large, rendering the resonance frequency of a high-frequency device likely to fluctuate with temperatures.

As the value of α does not reach 5 (vol %) and the value of β exceeds 95 (vol %), on the contrary, the temperature coefficient of resonance frequency (τ f) of the dielectric porcelain composition tends to grow large in a negative direction, leading to inconvenience that the resonance frequency of the high-frequency device is apt to fluctuate with temperatures.

Preferably in the present invention, MgO and $SiO_2$ contained as a part of the main component composition are contained in forsterite crystal form in the dielectric porcelain composition.

Whether or not the forsterite crystals are contained in the dielectric porcelain composition may be checked up by an X-ray diffractometry (XRD) system.

A dielectric porcelain composition containing a BaO—$Nd_2O_3$—$TiO_2$ base compound as a main component has a specific dielectric constant as high as ∈r=55 to 105, whereas forsterite has a specific dielectric constant as low as ∈r=6.8 in a single form. The dielectric porcelain composition here contains as main components a BaO—$Nd_2O_3$—$TiO_2$ base compound and a forsterite crystal, and so can have a reduced specific dielectric constant.

In most cases, the temperature coefficient τf of resonance frequency of a dielectric porcelain composition containing a BaO—$Nd_2O_3$—$TiO_2$ base compound as a main component has a positive value, whereas forsterite has a negative temperature coefficient of resonance frequency of tf=−65 (ppm/K). The incorporation of the BaO—$Nd_2O_3$—$TiO_2$ base compound and forsterite crystal as the main components of the dielectric porcelain composition enables the positive temperature coefficient of resonance frequency to be canceled out by the negative temperature coefficient of resonance frequency so that the temperature coefficient of resonance frequency of the dielectric porcelain composition can be brought to near zero. Further, if the content of forsterite crystals in the main component composition is increased or decreased, it is then possible to regulate the temperature coefficient of resonance frequency of the dielectric porcelain composition here.

A dielectric porcelain composition containing a BaO—$Nd_2O_3$—$TiO_2$ base compound as a main component has a Q·f value of Q·f=about 2,000 to about 8,000 GHz, whereas forsterite has a dielectric loss as small as Q·f=200,000 GHz in a single form. The incorporation of the BaO—$Nd_2O_3$—$TiO_2$ base compound and forsterite crystal as the main components of the dielectric porcelain composition allows that composition to have a low dielectric loss.

The dielectric porcelain composition here contains the desired subordinate components added to the main component composition so that it can be fired at a temperature lower than the melting point of a conductor formed of Ag, an alloy containing Ag as a primary component or the like.

Explanation of the Subordinate Components

As already noted, the dielectric porcelain composition of the present invention contains as subordinate components a zinc oxide, a boron oxide and a copper oxide.

When those subordinate components are represented by aZnO, $bB_2O_3$ and cCuO, a, b and c indicative of the weight ratio (wt %) of each subordinate component relative to the aforesaid main component are within the ranges of 0.05 (wt %)<a≦17.0 (wt %)

0.05 (wt %)<b≦17.0 (wt %)

0.05 (wt %)<c≦14.0 (wt %)

More specifically, the proportion of the zinc oxide contained relative to the main component composition is 0.05 (wt %)<a≦17.0 (wt %), as calculated on ZnO basis. Preferably, 0.1 (wt %)≦a≦12.0 (wt %), more preferably, 0.5 (wt %)≦a≦9.0 (wt %), and even more preferably, 1.0 0 (wt %)≦a≦7.0 (wt %).

As the proportion of the zinc oxide contained relative to the main component composition does not reach 0.05 (wt %) as calculated on ZnO basis, the dielectric porcelain composition tends to have a slender effect on low-temperature sintering. As the proportion of the zinc oxide contained relative to the main component composition exceeds 17.0 (wt %) as calculated on ZnO basis, on the other hand, there are dielectric losses tending to grow large and the Q·f value tending to go down.

The proportion of the boron oxide contained relative to the main component composition is 0.05 (wt %)<b≦17.0 (wt %), as calculated on $B_2O_3$ basis. Preferably, 0.1 (wt %)≦b≦12.0 (wt %), more preferably, 0.5 (wt %)≦b≦9.0 (wt %), and even more preferably, 1.0 (wt %)≦b≦7.0 (wt %).

As the proportion of the boron oxide contained relative to the main component composition does not reach 0.05 (wt %) as calculated on $B_2O_3$ basis, the dielectric porcelain composition tends to have a slender effect on low-temperature sintering. As the proportion of the boron oxide contained relative to the main component composition exceeds 17.0 (wt %) as calculated on $B_2O_3$ basis, on the other hand, there are dielectric losses tending to grow large and the Q·f value tending to go down.

The proportion of the copper oxide contained relative to the main component composition is 0.05 (wt %)<c≦14.0 (wt %), as calculated on CuO basis. Preferably, 0.1 (wt %)≦c≦9.0 (wt %), more preferably, 0.5 (wt %)≦c≦6.0 (wt %), and even more preferably, 1.0 (wt %)≦c≦4.0 (wt %).

As the proportion of the copper oxide contained relative to the main component composition does not reach 0.05 (wt %) as calculated on CuO basis, the dielectric porcelain composition tends to have a slender effect on low-temperature sintering. As the proportion of the copper oxide contained relative to the main component composition exceeds 14.0 (wt %) as calculated on CuO basis, on the other hand, there are dielectric losses tending to grow large and the Q·f value tending to go down.

The dielectric porcelain composition of the present invention contains BaO, $Nd_2O_3$, $TiO_2$, MgO and $SiO_2$ as the main components, and ZnO, $B_2O_3$ and CuO as the subordinate components. Especially if MgO and $SiO_2$ (forsterite crystals in particular) are contained as the main components, then it makes the specific dielectric constant lower than the general specific dielectric constant of BaO-rare earth oxide-$TiO_2$ base dielectric porcelain compositions.

The material of the dielectric porcelain composition of the present invention is similar to that of a BaO-rare earth oxide-$TiO_2$ base dielectric porcelain composition, and so its shrinkage behavior and linear expansion coefficient at the time of sintering are equivalent to those of the BaO-rare earth oxide-$TiO_2$ base dielectric porcelain composition. In other words, even when the dielectric porcelain composition of the present invention is joined to and fired with the BaO-rare earth oxide-$TiO_2$ base dielectric porcelain composition into a multilayer type device, defects are less likely to occur at the interface. Thus, the dielectric porcelain composition of the present invention can be joined to the BaO-rare earth oxide-$TiO_2$ base dielectric porcelain composition to fabricate a multilayer type device of high performance.

Note here that the dielectric porcelain composition according to the present invention may contain other compounds and elements within such a range that the objects and advantages of the present invention are achievable.

To provide a less expensive yet smaller device, the dielectric porcelain composition according to the present invention must have as an internal conductor a conductor formed of less expensive Ag, an alloy containing Ag as a main component or the like. Hence, the dielectric porcelain composition must have low-temperature sintering capability enough to enable firing to be carried out at a temperature lower than the melting point of the conductor used as the internal conductor. Because the dielectric characteristics of the dielectric porcelain composition are affected by firing temperatures, too, the firing temperature must be 860° C. to 1,000° C., and preferably 880° C. to 940° C.

An account of the dielectric loss of a dielectric porcelain composition that is an important consideration in the present invention is now given.

As an alternate current is applied to an ideal dielectric material, an electric current and a voltage have a phase difference of 90°. As the frequency of the alternate current grows high to a point where there is a high frequency, however, the polarization of the dielectric material or the orientation of polar molecules can never respond to changes in a high-frequency electric field, or an electric flux density has a phase delay with respect to an electric field due to the conduction of electrons or ions with the result that the electric current and the voltage come to have a phase other than 90°. The dielectric loss is a phenomenon in which a part of the energy of the aforesaid high frequency dissipates off in the form of heat. The magnitude of dielectric loss is represented by a reciprocal Q (Q=1/tan δ) of the tangent tan δ of a loss angle δ that is a difference between the phase difference of a real current and voltage and the 90° phase difference of an ideal current and voltage. For the estimation of dielectric loss of the dielectric porcelain composition according to the present invention, the value of Q·f that is the product of the aforesaid Q and resonance frequency is used. The smaller the dielectric loss, the larger the value of Q·f grows, and the larger the dielectric loss, the smaller the value of Q·f becomes. The dielectric loss is tantamount to the power loss of a high-frequency device, and so there is a demand for a dielectric porcelain composition having a greater Q·f value. In addition, a multilayer type device must have limited power losses so as to have higher performance; that is, the Q·f value must be at least 3,100 GHz, preferably 4,000 GHz or greater, and more preferably 4,500 GHz or greater.

One of the objects of the present invention is to make it possible to form a multilayer type device by joining the dielectric porcelain composition of the present invention to a BaO-rare earth oxide-$TiO_2$ base dielectric porcelain composition having a high specific dielectric constant. In other words, one technical challenge of the present invention is to provide a dielectric porcelain composition having a specific dielectric constant lower than that of that BaO-rare earth oxide-$TiO_2$ base dielectric porcelain composition. Some BaO-rare earth oxide-$TiO_2$ base dielectric porcelain compositions have been reported to have a specific dielectric constant of 50 to 105; however, the dielectric porcelain composition of the present invention is required to have a specific dielectric constant ∈r of up to 50. For a multilayer type device of higher performance, the dielectric constant ∈r should be preferably up to 40, and more preferably up to 30 and even more preferably 20~30.

An account of the temperature coefficient tf (ppm/K) of resonance frequency of a dielectric porcelain composition that is another important consideration in the present invention is now given.

The temperature coefficient τf (ppm/K) of resonance frequency of a dielectric porcelain composition is worked out from the following equation (1).

$$\tau f = [(f_T - f_{ref})/f_{ref}(T - T_{ref})] \times 1{,}000{,}000 \text{ (ppm/K)} \quad (1)$$

Here $f_T$ is indicative of a resonance frequency (kHz) at a temperature T, and $f_{ref}$ is indicative of a resonance frequency (kHz) at a reference temperature $T_{ref}$.

The magnitude of the absolute value of the temperature coefficient τf of resonance frequency means the magnitude of the quantity of change in the resonance frequency of a dielectric porcelain composition relative to temperature changes. For high-frequency devices like capacitors and dielectric filters, it is required to diminish resonance frequency changes with temperatures, and for the dielectric porcelain composition of the present invention, too, it is required to diminish the absolute value of the temperature coefficient τf of resonance frequency.

When the dielectric porcelain composition of the present invention is used for a dielectric resonator, the temperature coefficient τf of resonance frequency must be in the range of −45 (ppm/K) to +45 (ppm/K) so as to obtain further reductions in resonance frequency changes with temperatures. Further, for multilayer type devices of higher performance, the temperature coefficient τf must be in the range of −30 (ppm/K) to +30 (ppm/K), preferably −20 (ppm/K) to +20 (ppm/K), and more preferably −10 (ppm/K) to +10 (ppm/K). composition may be The estimation of low-temperature sintering capability of a dielectric porcelain composition may be made by firing the starting components at a gradually decreasing temperature to find out whether sintering proceeds to a level at which the desired dielectric characteristics are measurable. The estimation of dielectric characteristics of a dielectric porcelain composition may be made by taking measurements of dielectric loss, resonance frequency changes with temperature changes (the temperature coefficient of resonance frequency) and specific dielectric constant pursuant to JIS R 1627 1996 (Testing Method for the Dielectric Characteristics of Fine Ceramics in Microwave Applications).

Explanation of Dielectric Porcelain Composition Production Process

Next, the production process for the dielectric porcelain composition of the present invention is explained.

In the production process for the dielectric porcelain composition of the present invention, the barium-containing raw material, the neodymium-containing raw material, the titanium-containing raw material, the magnesium-containing raw material, the silicon-containing raw material, the zinc-containing raw material, the boron-containing raw material and the copper-containing raw material are fired together into a $BaO$—$Nd_2O_3$—$TiO_2$—$MgO$—$SiO_2$—$ZnO$—$B_2O_3$—$CuO$ base dielectric porcelain composition, wherein forsterite ($2MgO \cdot SiO_2$) powders are used as the magnesium-containing raw material and the silicon-containing raw material.

For production raw materials for the dielectric porcelain composition of the present invention, oxides and/or compounds that turn into oxides upon firing are used. Examples of the compounds that turn into oxides upon firing are carbonates, nitrates, oxalates, hydroxides, sulfides, and organic metal compounds.

FIG. 1 is illustrative of one embodiment of the dielectric porcelain composition production process according to the present invention.

The dielectric porcelain composition production process according to the present invention is now explained in more details with reference to FIG. 1.

First of all, for instance, barium carbonate, neodymium hydroxide and titanium oxide that are a part of the main component material are provided at the ready. Then, they are weighed and mixed together in given amounts, and calcined.

Mixing here is carried out such that the molar ratios x, y and z in the composition formula $xBaO \cdot yNd_2O_3 \cdot zTiO_2$ satisfy the above composition relations.

Barium carbonate, neodymium oxide and titanium oxide may be mixed either dry or wet. For instance, they may be mixed by means of a ball mill in a mixing mode using purified water or a solvent such as ethanol. The mixing time may be about 4 hours to about 24 hours.

Thereafter, the mixed raw material is dried at 100° C. to 200° C., preferably 120° C. to 140° C. for about 12 hours to about 36 hours, followed by calcination.

Calcination is a step for the synthesis of a $BaO$—$Nd_2O_3$—$TiO_2$ base compound from a mixture material comprising barium carbonate, neodymium hydroxide and titanium oxide. That step is preferably carried out at a calcination temperature of 1,100° C. to 1,500° C., especially 1,100° C. to 1,350° C. for about 1 hour to about 24 hours.

The synthesized $BaO$—$Nd_2O_3$—$TiO_2$ base compound is pulverized into powders, and dried. Pulverization may be carried out either dry or wet, for instance, by means of a ball mill in a pulverization mode using purified water or a solvent such as ethanol. The pulverization time may be about 4 hours to about 24 hours.

The powders obtained by pulverization may be dried at a drying temperature of 100° C. to 200° C., preferably 120° C. to 140° C. for about 12 hours to about 36 hours. Thus, $BaO$—$Nd_2O_3$—$TiO_2$ base compound powders may be obtained.

Then, magnesium oxide and silicon oxide that are another part of the main component material are at the ready. Then, they are weighed and mixed together in given amounts, and calcined. Magnesium oxide and silicon oxide may be mixed either dry or wet. For instance, they may be mixed by means of a ball mill in a mixing mode using purified water or a solvent such as ethanol. The mixing time may be about 4 hours to about 24 hours.

Thereafter, the mixed raw material is dried at 100° C. to 200° C., preferably 120° C. to 140° C. for about 12 hours to about 36 hours, followed by calcination.

Calcination is a step for the synthesis of a forsterite crystal from a mixture of magnesium oxide and silicon oxide. That step is preferably carried out at a calcination temperature of 1,100° C. to 1,500° C., especially 1,100° C. to 1,350° C. for about 1 hour to about 24 hours.

The incorporation as the main components of the $BaO$—$Nd_2O_3$—$TiO_2$ base compound and the forsterite crystal ensures that, by the effect of the forsterite crystal, the specific dielectric constant ∈r of the dielectric porcelain composition is let go down, and the temperature coefficient of resonance frequency is brought to near zero, ending up with reduced dielectric losses. To enhance the effect of forsterite added, it is required to reduce a portion of the aforesaid raw material that does not turn into forsterite and remains unreacted; it is desired that the aforesaid raw material mixing be carried out such that the number of moles of magnesium is twice as many as that of silicon.

The synthesized forsterite is pulverized into powders, and dried. Pulverization may be carried out either dry or wet, for instance, by means of a ball mill in a pulverization mode using purified water or a solvent such as ethanol. The pulverization time may be about 4 hours to about 24 hours.

The powders obtained by pulverization may be dried at a drying temperature of 100° C. to 200° C., preferably 120° C. to 140° C. for about 12 hours to about 36 hours. Thus, forsterite powders may be obtained.

Instead of obtaining forsterite powders by the synthesis and pulverization of forsterite from the magnesium-containing raw material and the silicon-containing raw material as shown in FIG. 1, it is acceptable to use commercially available forsterite. That is, a commercial forsterite product may be pulverized by means of a ball mill in a pulverization mode using purified water or a solvent such as ethanol, and then dried at 100° C. to 200° C., preferably 120° C. to 140° C. for about 12 hours to about 36 hours into forsterite powders.

Next, the $BaO-Nd_2O_3-TiO_2$ base compound powders, the forsterite powders, and zinc oxide, boron oxide and copper oxide that are weighed in such a given range as to satisfy the aforesaid subordinate component composition are mixed together into a raw mixture powder material.

Mixing may be carried out either dry or wet, for instance, by means of a ball mill in a mixing mode using purified water or a solvent such as ethanol. The mixing time may be about 4 hours to about 24 hours.

Next, the raw mixture powder material is again calcined at a temperature lower than the firing temperature, for instance, 700° C. to 800° C. for about 1 to about 10 hours. With that calcinations carried out at a lower temperature, forsterite does not melt so that a crystal form of forsterite can be incorporated in the dielectric porcelain composition. Thereafter, the calcined raw mixture powder material is pulverized and dried. Pulverization is carried out either dry or wet, for instance, by means of a ball mill in a pulverization mode using purified water or a solvent such as ethanol. The pulverization time may be about 4 hours to about 24 hours. The powders obtained by pulverization may be dried at a treatment temperature of 100° C. to 200° C., preferably 120° C. to 140° C. for about 12 hours to about 36 hours. Thus, by carrying out the second calcination and pulverization, the main and subordinate components can be placed in a uniform state so that the dielectric porcelain composition here can be obtained in a uniform state at later production steps.

After mixing the powders obtained as described above with an organic binder based on, for instance, polyvinyl alcohol, acryl, and ethyl cellulose, the mixture is molded in a desired shape, followed by sintering by firing of the molded product. Molding may be carried out either in a wet mode such as a sheet process or printing, or in a dry mode such as press molding; appropriate selection may be from molding processes depending on the desired shape. Firing is preferably carried out in an oxygen atmosphere such as air, and the firing temperature must be lower than the melting point of Ag or an alloy containing Ag as a main component that forms a conductor that is used as an internal electrode, for instance, at 860° C. to 1,000° C., preferably 880° C. to 940° C.

A multilayer type device is fabricated of a multilayer ceramic substrate comprising a plurality of ceramic layers, each with a built-in dielectric device such as a capacitor or inductor. The multilayer ceramic substrate is fabricated by stacking and co-firing a plurality of green sheets of ceramic material having different dielectric characteristics while conductors as internal conductors are located at interfaces optionally with through-holes. By stacking a green sheet molded of the dielectric porcelain composition of the present invention on a green sheet molded of a general BaO-rare earth oxide-$TiO_2$ base dielectric porcelain composition known in the art, it is possible to fabricate a multilayer ceramic substrate using the dielectric porcelain composition of the present invention.

The present invention is now explained in more details with reference to specific examples.

EXPERIMENTAL EXAMPLE 1

Sample Preparation and How to Measure the Desired Physical Properties

Such various dielectric porcelain composition samples as set out in Table 1 were prepared in the following manners. The definitions of $\alpha$, $\beta$, x, y and z that specify the main component composition and a, b and c that specify the amounts of the subordinate components added have been mentioned.

A basic production process is now explained specifically with reference to Sample No. 1 that is an inventive sample.

First, the starting materials for the main components $BaCO_3$, $Nd(OH)_3$ and $TiO_2$ were weighed such that x, y and z, i.e., the molar ratios of BaO, $Nd_2O_3$ and $TiO_2$ in the $BaO-Nd_2O_3-TiO_2$ base compound after calcination had such values as set out in the main component composition column of Sample No. 1 in Table 1, given later. That is, the starting materials were weighed such that x=18.5 (mol %), y=15.4 (mol %) and z=66.1 (mol %).

Purified water was added to the weighed starting materials at a slurry concentration of 25%, which were in turn wet mixed in a ball mill for 16 hours, followed by drying at 120° C. for 24 hours. The dried powders were calcined in air (1,200° C., 4 hours). Purified water was added to the $BaO-Nd_2O_3-TiO_2$ base compound after calcination at a slurry concentration of 25%, which was then pulverized in a ball mill for 16 hours, and thereafter dried at 120° C. for 24 hours to prepare $BaO-Nd_2O_3-TiO_2$ base compound powders.

Then, the remaining starting materials for the main components, that is, MgO and $SiO_2$ were weighed such that the number of moles of magnesium was twice as large as that of silicon. Purified water was added to them at a slurry concentration of 25%, which were wet mixed in a ball mill for 16 hours, followed by drying at 120° C. for 24 hours.

The dried powders were calcined in air (1,200° C., 3 hours). Purified water was added to the forsterite after calcination at a slurry concentration of 25%, which was in turn pulverized in a ball mill for 16 hours, and thereafter dried at 120° C. for 24 hours to prepare forsterite powders.

Next, ZnO, $B_2O_3$ and CuO that were the raw materials for the subordinate components were at the ready.

Then, the pulverized $BaO-Nd_2O_3-TiO_2$ base compound powders and the pulverized forsterite powders were blended together at such mixing ratios as set out in Table 1, given later, and the subordinate components were blended with those main components at such blending ratios as set out at the amount-of-subordinate-component-added column of Sample No. 1 in Table 1 to obtain raw mixture powders. Specifically, weighing was done such that $\alpha$=5 (vol %), $\beta$=95 (vol %), a=6.0 (wt %), b=4.5 (wt %) and c=3.0 (wt %), purified water was added at a slurry concentration of 25%, a 16-hour wet mixing was carried out in a ball mill, and drying was performed at 120° C. for 24 hours to obtain the raw mixture powders.

The thus obtained raw mixture powders were again calcined in air (750° C., 2 hours) to obtain calcined powders.

Purified water was added to the resultant calcined powders in such a way as to provide a slurry concentration of 25%, which were again wet pulverized in a ball mill for 16 hours, and thereafter dried at 120° C. for 24 hours. An aqueous solution of polyvinyl alcohol was added as a binder to the re-pulverized powders for granulation, and the resulting granules were molded into a columnar shape of 12 mm in diameter and 6 mm in height. The molded column was fired at the temperature indicated at the firing temperature column of Sample No. 1 in Table 1, viz., 900° C. for 1 hour to obtain a dielectric porcelain composition.

The thus obtained dielectric porcelain composition was trimmed off at its surface to prepare a columnar pellet of 10 mm in diameter and 5 mm in height as a measuring Sample No. 1.

Dielectric porcelain composition Sample No. 1 was measured for a specific dielectric constant $\epsilon r$, a Q·f value and a temperature coefficient $\tau f$ of resonance frequency pursuant to JIS R 1627 1996 (Testing Method for the Dielectric Characteristics of Fine Ceramics in Microwave Applications). Measurements were carried out at a frequency of 13.5 GHz, and resonance frequency was measured at a temperature ranging from −40° C. to 85° C. to work out the temperature coefficient $\tau f$ of resonance frequency from the aforesaid calculation equation (1).

From the fact that each physical property could be measured as indicated in Table 1, Sample No. 1 is found to have been fully sintered at the low temperature of 900° C. Note here that Sample No. 1 is found to have such physical properties as indicated by a specific dielectric constant of $\epsilon r=9.3$, a Q·f value of 7,782 (GHz) and a temperature coefficient of resonance frequency of $\tau f=-44$ (ppm/K).

Following that Sample No. 1 preparation process, such various samples as set out in Table 1 were prepared. To what degree low-temperature firing was possible was found out (in Table 1, samples with "unmeasurable" could not be sintered to a level at which dielectric characteristics could be measured), and samples that could be sintered were measured for the specific dielectric constant $\epsilon r$, the Q·f value (measured at a measuring frequency range of 5.7 to 13.5 GHz) and the temperature coefficient $\tau f$ of resonance frequency.

The results are summed up in Table 1, in which asterisked (*) samples are comparative ones.

TABLE 1

| Sample No. | Main Component Composition | | | | | Amounts of Subordinate Components Added | | |
|---|---|---|---|---|---|---|---|---|
| | α | β | x | y | z | a | b | c |
| 1 | 5 | 95 | 18.5 | 15.4 | 66.1 | 6.0 | 4.5 | 3.0 |
| 2 | 15 | 85 | 18.5 | 15.4 | 66.1 | 6.0 | 4.5 | 3.0 |
| 3 | 25 | 75 | 18.5 | 15.4 | 66.1 | 6.0 | 4.5 | 3.0 |
| 4 | 35 | 65 | 18.5 | 15.4 | 66.1 | 6.0 | 4.5 | 3.0 |
| 5 | 45 | 55 | 18.5 | 15.4 | 66.1 | 6.0 | 4.5 | 3.0 |
| 6 | 55 | 45 | 18.5 | 15.4 | 66.1 | 6.0 | 4.5 | 3.0 |
| 7 | 65 | 35 | 18.5 | 15.4 | 66.1 | 6.0 | 4.5 | 3.0 |
| 8 | 75 | 25 | 18.5 | 15.4 | 66.1 | 6.0 | 4.5 | 3.0 |
| *9 | 85 | 15 | 18.5 | 15.4 | 66.1 | 6.0 | 4.5 | 3.0 |
| 10 | 55 | 45 | 18.5 | 15.4 | 66.1 | 2.0 | 1.5 | 1.0 |
| 11 | 55 | 45 | 18.5 | 15.4 | 66.1 | 2.0 | 1.5 | 1.0 |
| 12 | 55 | 45 | 18.5 | 15.4 | 66.1 | 4.0 | 3.0 | 2.0 |
| 13 | 55 | 45 | 18.5 | 15.4 | 66.1 | 4.0 | 3.0 | 2.0 |
| 14 | 55 | 45 | 18.5 | 15.4 | 66.1 | 6.0 | 4.5 | 3.0 |
| 15 | 55 | 45 | 18.5 | 15.4 | 66.1 | 8.0 | 6.0 | 4.0 |
| 16 | 55 | 45 | 18.5 | 15.4 | 66.1 | 8.0 | 6.0 | 4.0 |
| 17 | 55 | 45 | 18.5 | 15.4 | 66.1 | 6.0 | 4.5 | 3.0 |
| 18 | 55 | 45 | 18.5 | 15.4 | 66.1 | 6.0 | 4.5 | 3.0 |
| 19 | 55 | 45 | 18.5 | 15.4 | 66.1 | 6.0 | 4.5 | 3.0 |

| Sample No. | Firing Temp. (° C.) | Dielectric characteristics | | |
|---|---|---|---|---|
| | | $\epsilon r$ | Q · f (GHz) | $\tau f$ (ppm/k) |
| 1 | 900 | 9.3 | 7,782 | −44 |
| 2 | 900 | 10.2 | 7,515 | −38 |
| 3 | 900 | 13.3 | 6,754 | −29 |
| 4 | 900 | 17.0 | 6,219 | −20 |
| 5 | 900 | 21.1 | 5,622 | −9 |
| 6 | 900 | 26.6 | 5,124 | 1 |
| 7 | 900 | 37.0 | 4,887 | 16 |
| 8 | 900 | 48.3 | 4,670 | 33 |
| *9 | 900 | 55.1 | 4,529 | 46 |
| 10 | 950 | 28.4 | 4,519 | 24 |
| 11 | 1,000 | 29.4 | 3,852 | 23 |
| 12 | 900 | 27.4 | 4,439 | 9 |
| 13 | 950 | 28.2 | 3,759 | 8 |
| 14 | 950 | 27.2 | 4,111 | −1 |
| 15 | 900 | 25.6 | 5,776 | −5 |
| 16 | 950 | 26.0 | 4,532 | −5 |
| 17 | 850 | unmeasurable | | |
| 18 | 880 | 25.4 | 5,044 | 2 |
| 19 | 910 | 26.9 | 4,982 | 0 |

| Sample No. | Main Component Composition | | | | | Amounts of Subordinate Components Added | | |
|---|---|---|---|---|---|---|---|---|
| | α | β | x | y | z | a | b | c |
| 20 | 55 | 45 | 18.5 | 15.4 | 66.1 | 6.0 | 4.5 | 3.0 |
| 21 | 65 | 35 | 16.7 | 9.7 | 73.6 | 4.0 | 3.0 | 2.0 |
| 22 | 70 | 30 | 16.7 | 9.7 | 73.6 | 4.0 | 3.0 | 2.0 |
| 23 | 75 | 25 | 16.7 | 9.7 | 73.6 | 4.0 | 3.0 | 2.0 |
| 24 | 60 | 40 | 16.7 | 12.7 | 70.6 | 4.0 | 3.0 | 2.0 |
| 25 | 65 | 35 | 16.7 | 12.7 | 70.6 | 4.0 | 3.0 | 2.0 |
| 26 | 70 | 30 | 16.7 | 12.7 | 70.6 | 4.0 | 3.0 | 2.0 |
| 27 | 65 | 35 | 16.7 | 21.7 | 61.6 | 4.0 | 3.0 | 2.0 |
| 28 | 70 | 30 | 16.7 | 21.7 | 61.6 | 4.0 | 3.0 | 2.0 |
| 29 | 75 | 25 | 16.7 | 21.7 | 61.6 | 4.0 | 3.0 | 2.0 |
| *30 | 55 | 45 | 6.7 | 26.7 | 66.6 | 6.0 | 4.5 | 3.0 |
| 31 | 55 | 45 | 9.0 | 24.4 | 66.6 | 6.0 | 4.5 | 3.0 |
| 32 | 55 | 45 | 11.7 | 21.7 | 66.6 | 6.0 | 4.5 | 3.0 |
| 33 | 55 | 45 | 16.7 | 16.7 | 66.6 | 6.0 | 4.5 | 3.0 |
| 34 | 55 | 45 | 22.0 | 11.4 | 66.6 | 6.0 | 4.5 | 3.0 |
| *35 | 55 | 45 | 23.7 | 12.7 | 63.6 | 6.0 | 4.5 | 3.0 |
| *36 | 55 | 45 | 18.7 | 7.7 | 73.6 | 6.0 | 4.5 | 3.0 |
| 37 | 55 | 45 | 17.0 | 9.0 | 74.0 | 6.0 | 4.5 | 3.0 |
| 38 | 55 | 45 | 16.7 | 15.7 | 67.6 | 6.0 | 4.5 | 3.0 |
| 39 | 55 | 45 | 16.7 | 18.7 | 64.6 | 6.0 | 4.5 | 3.0 |

| Sample No. | Firing Temp. (° C.) | Dielectric characteristics | | |
|---|---|---|---|---|
| | | $\epsilon r$ | Q · f (GHz) | $\tau f$ (ppm/k) |
| 20 | 940 | 27.4 | 4,520 | −1 |
| 21 | 900 | 28.9 | 4,400 | 9 |
| 22 | 900 | 32.2 | 4,262 | 13 |
| 23 | 900 | 35.0 | 4,178 | 15 |
| 24 | 900 | 27.4 | 5,257 | 2 |
| 25 | 900 | 30.5 | 5,128 | 7 |
| 26 | 900 | 33.4 | 5,040 | 11 |
| 27 | 900 | 30.0 | 6,113 | 14 |
| 28 | 900 | 33.1 | 5,951 | 18 |
| 29 | 900 | 35.8 | 5,095 | 21 |
| *30 | 900 | 19.2 | 3,003 | −23 |
| 31 | 900 | 20.3 | 4,015 | −38 |
| 32 | 900 | 21.5 | 4,052 | −37 |
| 33 | 900 | 25.6 | 6,311 | −36 |
| 34 | 900 | 28.2 | 4,085 | −30 |
| *35 | 900 | unmeasurable | | |
| *36 | 900 | 29.7 | 2,937 | 17 |
| 37 | 900 | 28.9 | 4,096 | 6 |
| 38 | 900 | 26.2 | 6,448 | −11 |
| 39 | 900 | 24.0 | 5,625 | −26 |

| Sample No. | Main Component Composition | | | | | Amounts of Subordinate Components Added | | |
|---|---|---|---|---|---|---|---|---|
| | α | β | x | y | z | a | b | c |
| 40 | 55 | 45 | 9.4 | 29.0 | 61.6 | 6.0 | 4.5 | 3.0 |
| *41 | 55 | 45 | 16.7 | 30.7 | 52.6 | 6.0 | 4.5 | 3.0 |
| *42 | 55 | 45 | 16.7 | 26.7 | 56.6 | 6.0 | 4.5 | 3.0 |
| 43 | 55 | 45 | 16.5 | 21.5 | 62.0 | 6.0 | 4.5 | 3.0 |
| 44 | 55 | 45 | 18.5 | 11.7 | 69.6 | 6.0 | 4.5 | 3.0 |

TABLE 1-continued

| Sample No. | α | β | x | y | z | a | b | c |
|---|---|---|---|---|---|---|---|---|
| *45 | 55 | 45 | 11.7 | 11.7 | 76.6 | 6.0 | 4.5 | 3.0 |
| *46 | 55 | 45 | 18.5 | 15.4 | 66.1 | 0 | 0 | 0 |
| *47 | 55 | 45 | 18.5 | 15.4 | 66.1 | 0.05 | 4.5 | 3.0 |
| 48 | 55 | 45 | 18.5 | 15.4 | 66.1 | 0.1 | 4.5 | 3.0 |
| 49 | 55 | 45 | 18.5 | 15.4 | 66.1 | 0.5 | 4.5 | 3.0 |
| 50 | 55 | 45 | 18.5 | 15.4 | 66.1 | 3.0 | 4.5 | 3.0 |
| 51 | 55 | 45 | 18.5 | 15.4 | 66.1 | 9.0 | 4.5 | 3.0 |
| 52 | 55 | 45 | 18.5 | 15.4 | 66.1 | 12.0 | 4.5 | 3.0 |
| 53 | 55 | 45 | 18.5 | 15.4 | 66.1 | 16.0 | 4.5 | 3.0 |
| *54 | 55 | 45 | 18.5 | 15.4 | 66.1 | 6.0 | 0.05 | 3.0 |
| 55 | 55 | 45 | 18.5 | 15.4 | 66.1 | 6.0 | 0.1 | 3.0 |
| 56 | 55 | 45 | 18.5 | 15.4 | 66.1 | 6.0 | 0.5 | 3.0 |
| 57 | 55 | 45 | 18.5 | 15.4 | 66.1 | 6.0 | 3.0 | 3.0 |
| 58 | 55 | 45 | 18.5 | 15.4 | 66.1 | 6.0 | 9.0 | 3.0 |
| 59 | 55 | 45 | 18.5 | 15.4 | 66.1 | 6.0 | 12.0 | 3.0 |

| | Firing | Dielectric characteristics | | |
|---|---|---|---|---|
| Sample No. | Temp. (° C.) | εr | Q · f (GHz) | τf (ppm/k) |
| 40 | 900 | 20.5 | 4,195 | −40 |
| *41 | 900 | 17.6 | 2,864 | −40 |
| *42 | 900 | 17.8 | 3,020 | −38 |
| 43 | 900 | 20.0 | 5,266 | −33 |
| 44 | 900 | 24.9 | 7,109 | 4 |
| *45 | 900 | unmeasurable | | |
| *46 | 900 | unmeasurable | | |
| *47 | 900 | unmeasurable | | |
| 48 | 900 | 23.8 | 4,824 | 7 |
| 49 | 900 | 24.9 | 4,986 | 6 |
| 50 | 900 | 27.1 | 5,058 | 5 |
| 51 | 900 | 26.2 | 4,875 | −2 |
| 52 | 900 | 25.5 | 4,125 | −5 |
| 53 | 900 | 24.7 | 3,754 | −8 |
| *54 | 900 | unmeasurable | | |
| 55 | 900 | 24.6 | 4,700 | 6 |
| 56 | 900 | 25.0 | 4,776 | 5 |
| 57 | 900 | 27.0 | 5,305 | 3 |
| 58 | 900 | 22.1 | 4,631 | −1 |
| 59 | 900 | 20.3 | 4,022 | −2 |

| Sample No. | Main Component Composition | | | | | Amounts of Subordinate Components Added | | |
|---|---|---|---|---|---|---|---|---|
| | α | β | x | y | z | a | b | c |
| 60 | 55 | 45 | 18.5 | 15.4 | 66.1 | 6.0 | 16.0 | 3.0 |
| *61 | 55 | 45 | 18.5 | 15.4 | 66.1 | 6.0 | 4.5 | 0.05 |
| 62 | 55 | 45 | 18.5 | 15.4 | 66.1 | 6.0 | 4.5 | 0.1 |
| 63 | 55 | 45 | 18.5 | 15.4 | 66.1 | 6.0 | 4.5 | 0.5 |
| 64 | 55 | 45 | 18.5 | 15.4 | 66.1 | 6.0 | 4.5 | 1.5 |
| 65 | 55 | 45 | 18.5 | 15.4 | 66.1 | 6.0 | 4.5 | 6.0 |
| 66 | 55 | 45 | 18.5 | 15.4 | 66.1 | 6.0 | 4.5 | 9.0 |
| 67 | 55 | 45 | 18.5 | 15.4 | 66.1 | 6.0 | 4.5 | 12.0 |

| | Firing | Dielectric characteristics | | |
|---|---|---|---|---|
| Sample No. | Temp. (° C.) | εr | Q · f (GHz) | τf (ppm/k) |
| 60 | 900 | 17.4 | 3,479 | −4 |
| *61 | 900 | unmeasurable | | |
| 62 | 900 | 25.8 | 4,922 | 4 |
| 63 | 900 | 25.9 | 5,033 | 3 |
| 64 | 900 | 27.0 | 5,245 | 2 |
| 65 | 900 | 26.0 | 4,827 | −6 |
| 66 | 900 | 25.5 | 4,068 | −11 |
| 67 | 900 | 25.0 | 3,190 | −15 |

*comparative example

Dielectric porcelain composition Sample Nos. 1-9 were prepared at varied α and β ratios. Whatever the α and β ratios, the samples could all be prepared at the firing temperature of 900° C., and enabled conductors formed of Ag, alloys containing Ag as a main component or the like to be used as a conductor. As the value of α becomes small as in Sample No. 1, however, the temperature coefficient τf of resonance frequency of the dielectric porcelain composition tends to grow large in a negative direction, resulting in an increase in changes with temperature changes in the resonance frequency of a high-frequency device.

With comparative Sample No. 9 wherein the value of α exceeds 85 (vol %) and the value of β does not reach 15 (vol %), on the other hand, the dielectric porcelain composition has a specific dielectric constant exceeding 50, and even though it is joined to a BaO-rare earth oxide-$TiO_2$ base dielectric porcelain composition, it will be difficult to fabricate a multilayer type device of higher performance. Moreover, the temperature coefficient τf of resonance frequency tends to grow large in a positive direction, resulting in an increase in changes with temperature changes in the resonance frequency of a high-frequency device.

In Sample Nos. 1-8 in which the values of α and β are within the inventive ranges, if α grows large and β becomes small, then the Q·f value tends to go down, τf tends to shift in the positive direction, and the specific dielectric constant εr tends to grow large. If α becomes small and β grows large, on the contrary, then the Q·f value tends to grow large, τf tends to shift in the negative direction, and the specific dielectric constant εr tends to become small. In other words, if the α and β ratio is varied in the inventive range, it is then possible to obtain a dielectric porcelain composition having a practically suitable specific dielectric constant εr, Q·f value and temperature coefficient τf of resonance frequency.

In inventive Sample Nos. 10-16, dielectric porcelain compositions were prepared with fluctuations in the whole amount of the subordinate components yet while the subordinate components were kept at a constant ratio. It is found that as the whole amount of the subordinate components increases, it causes the temperature coefficient τf of resonance frequency to have a tendency toward shifting in the negative direction.

In inventive Sample Nos. 17-20, dielectric porcelain compositions were prepared at varied firing temperatures. Sample No. 17 was obtained by firing at the firing temperature of 850° C.; however, it remains not sintered because of too low a firing temperature. Sample Nos. 18-20 were obtained by firing at the firing temperatures of 880° C. to 940° C. It is seen that as the firing temperature grows high, it causes the dielectric loss to tend to grow large and the Q·f value to tend to become small.

In Sample Nos. 21-41, dielectric porcelain compositions were prepared while there were the values of x, y and z varied, which are indicative of the molar ratios of BaO, $Nd_2O_3$ and $TiO_2$ in the BaO—$Nd_2O_3$—$TiO_2$ base compound that is one of the main components.

Sample Nos. 30-35 were prepared while the content of BaO in the BaO—$Nd_2O_3$—$TiO_2$ base compound was varied. As the content of BaO deviates largely from the lower limit of the inventive range or it becomes too small as in comparative Sample No. 30, it causes the dielectric loss to grow large and the Q·f value to become small. On the other hand, as the content of BaO deviates largely from the upper limit or it grows too large as in comparative Sample No. 35, it will render the firing of the BaO—$Nd_2O_3$—$TiO_2$ base compound impossible. As the content of BaO is in the inventive range as in inventive Sample Nos. 31-34, it makes it possible to produce dielectric porcelain compositions having good enough characteristics.

Sample Nos. 21-29 and Sample Nos. 36-41 were prepared with variations in the content of $Nd_2O_3$ in the BaO—$Nd_2O_3$—$TiO_2$ base compound. As the content of $Nd_2O_3$ deviates largely from the upper limit of the inventive range or it becomes too large as in comparative Sample No. 41, it causes the dielectric loss to grow large, the Q·f value to become small, and the temperature coefficient τf of resonance frequency to shift largely in the negative direction, resulting in an increase in the fluctuation of resonance frequency relative to temperatures. On the other hand, as the content of $Nd_2O_3$ deviates largely from the lower limit or it becomes too small as in comparative Sample No. 36, it causes the dielectric loss to grow large and the Q·f value to become small. As the content of $Nd_2O_3$ is in the inventive range, it makes it possible to fabricate dielectric porcelain compositions having good enough characteristics.

Sample Nos. 42-45 were prepared with changes in the content of $TiO_2$ in the $BaO-Nd_2O_3-TiO_2$ base compound. As the content of $TiO_2$ decreases, it causes the Q·f value to tend to become small. As the content of $TiO_2$ deviates largely from the lower limit of the inventive range or it becomes too small as in comparative Sample No. 42, there is the dielectric loss growing large, and the Q·f value becoming small. On the other hand, as the content of $TiO_2$ deviates largely from the upper limit or it becomes too large as in comparative Sample No. 45, it will render the firing of the $BaO-Nd_2O_3-TiO_2$ base compound impossible. As the content of $TiO_2$ is in the inventive range, it makes it possible to fabricate dielectric porcelain compositions having good enough characteristics.

Dielectric porcelain composition Sample Nos. 46-67 were prepared with changes in the content of the subordinate components. Comparative dielectric porcelain composition Sample No. 46 was prepared with no subordinate components at all. In the absence of the subordinate components, any dielectric porcelain composition could not be prepared by low-temperature firing.

Dielectric porcelain composition Sample Nos. 47-53 were prepared with variations in the content of ZnO, one of the subordinate components. As the content of ZnO deviates largely from the lower limit of the inventive range or it becomes too small, a dielectric porcelain composition cannot be sintered at low temperatures. On the other hand, as the content of ZnO deviates largely from the upper limit or it becomes too large, the dielectric loss grows large, and the Q·f value becomes small. As the content of ZnO is in the inventive range, it makes it possible to fabricate dielectric porcelain composition having good enough characteristics.

Dielectric porcelain composition Sample Nos. 54-60 were prepared with variations in the content of $B_2O_3$, one of the subordinates. As the content of $B_2O_3$ deviates largely from the lower limit of the inventive range or it becomes too small, a dielectric porcelain composition cannot be sintered at low temperatures. On the other hand, as the content of $B_2O_3$ deviates largely from the upper limit or it becomes too large, the dielectric loss grows large, and the Q·f value becomes small. As the content of $B_2O_3$ is in the inventive range, it makes it possible to fabricate dielectric porcelain composition having good enough characteristics.

Dielectric porcelain composition Sample Nos. 61-67 were prepared with variations in the content of CuO, one of the subordinate components. As the content of CuO deviates largely from the lower limit of the inventive range or it becomes too small, a dielectric porcelain composition cannot be sintered at low temperatures. On the other hand, as the content of CuO deviates largely from the upper limit or it becomes too large, the dielectric loss grows large, and the Q·f value becomes small. As the content of CuO is in the inventive range, it makes it possible to fabricate dielectric porcelain composition having good enough characteristics.

As expounded above, the present invention provides a dielectric porcelain composition that contains as main components BaO, $Nd_2O_3$, $TiO_2$, MgO and $SiO_2$ in the inventive range and as subordinate components ZnO, $B_2O_3$ and CuO in the inventive range. It is thus possible to obtain a dielectric porcelain composition having a low-temperature sintering capability enough to use a conductor formed of Ag, an alloy containing Ag as a main component or the like as an internal conductor, limited dielectric losses, limited resonance frequency changes with temperature changes, and a specific dielectric constant that is lower than that of a BaO-rare earth oxide-$TiO_2$ base dielectric porcelain composition.

(2) Explanation of the Invention According to the Second Group of This Application The best mode for carrying out the invention according to the second group of this application is now explained. First of all, the arrangement of the dielectric porcelain composition according to the second group is explained.

Explanation of the Dielectric Porcelain Composition According to the Second Group The dielectric porcelain composition of the present invention comprises a main component composition represented by a composition formula $\{\alpha(xBaO \cdot yNd_2O_3 \cdot zTiO_2) + \beta(2MgO \cdot SiO_2)\}$.

Further, the dielectric porcelain composition of the present invention comprises a zinc oxide, a boron oxide, a copper oxide and a manganese oxide as subordinate components relative to that main component composition.

In what follows, the main component composition, and the subordinate component composition of the dielectric porcelain composition according to the present invention are explained in further details. First of all, the main component composition is explained.

Explanation of the Main Component Composition

As already noted, the dielectric porcelain composition of the present invention contains the main component composition represented by the composition formula $\{\alpha(xBaO \cdot yNd_2O_3 \cdot zTiO_2) + \beta(2MgO \cdot SiO_2)\}$, wherein x, y and z indicative of the molar ratios (mol %) of BaO, $Nd_2O_3$ and $TiO_2$ are in the ranges of $9 \text{ (mol \%)} \leq x \leq 22 \text{ (mol \%)}$ $9 \text{ (mol \%)} \leq y \leq 29 \text{ (mol \%)}$ $61 \text{ (mol \%)} \leq z \leq 74 \text{ (mol \%)}$ and have a relation of x+y+z=100 (mol %).

Further, α and β indicative of the volume ratio (vol %) of each component in that main component composition are in the ranges of $15 \text{ (vol \%)} \leq \alpha \leq 75 \text{ (vol \%)}$ $25 \text{ (vol \%)} \leq \beta \leq 85 \text{ (vol \%)}$ and have a relation of α+β=100 (vol %).

It is required that the proportion x of BaO contained be within the aforesaid range, that is, 9 (mol %)≤x≤22 (mol %). Preferably, 10 (mol %)≤x≤19 (mol %), and more preferably, 14 (mol %)≤x≤19 (mol %).

As the proportion of BaO contained does not reach 9 (mol %), there are dielectric losses tending to grow large and the Q·f value tending to go down, resulting in an increase in the power loss of a high-frequency device. As the proportion of BaO contained exceeds 22 (mol %), on the other hand, low-temperature sintering capability tends to become worse, resulting in inability to form any dielectric porcelain composition. Otherwise, the Q·f value goes further down, leading to inconvenience that the power loss of the high-frequency device grows large.

It is required that the proportion of $Nd_2O_3$ contained be within the aforesaid range, that is, 9 (mol %)$\leq$y$\leq$29 (mol %). Preferably, 9 (mol %)$\leq$y$\leq$22 (mol %), and more preferably 12, (mol %)$\leq$y$\leq$17 (mol %).

As the proportion of $Nd_2O_3$ contained does not reach 9 (mol %), there are dielectric losses tending to grow large and the Q·f value tending to go down, resulting in an increase in the power loss of a high-frequency device. As the proportion of $Nd_2O_3$ contained exceeds 29 (mol %), on the other hand, there are dielectric losses tending to grow large and the Q·f value tending to go down, and the temperature coefficient of resonance frequency ($\tau$ f) tends to grow large in a negative direction as well. Consequently, the power loss of the high-frequency device will grow large, and the resonance frequency of the high-frequency device will be likely to fluctuate with temperatures.

It is required that the proportion of $TiO_2$ contained be within the aforesaid range, that is, 61 (mol %)$\leq$z$\leq$74 (mol %). Preferably, 61.5 (mol %)$\leq$z$\leq$74 (mol %), and more preferably, 65 (mol %)$\leq$z$\leq$71 (mol %).

As the proportion of $TiO_2$ contained does not reach 61 (mol %), there are dielectric losses tending to grow large and the Q·f value tending to go down, and the temperature coefficient of resonance frequency ($\tau$ f) tends to grow large in a negative direction as well. Consequently, the power loss of a high-frequency device will grow large, and the resonance frequency of the high-frequency device will be likely to fluctuate with temperatures. As the proportion of $TiO_2$ contained exceeds 74 (mol %), on the other hand, low-temperature sintering capability becomes worse, which will tend to result in inability to form any dielectric porcelain composition.

In the composition formula for the aforesaid main component composition, $\alpha$ and $\beta$ are indicative of the volume ratios of (1) BaO, $Nd_2O_3$ and $TiO_2$ and (2) MgO and $SiO_2$.

As already noted, $\alpha$ and $\beta$ are in the ranges of 15 (vol %)$\leq\alpha\leq$75 (vol %)

25 (vol %)$\leq\beta\leq$85 (vol %)

and have a relation of $\alpha+\beta=100$ (vol %). Preferably, 25 (vol %)$\leq\alpha\leq$65 (vol %) and 35 (vol %)$\leq\beta\leq$65 (vol %), and more preferably, 35 (vol %)$\leq\alpha\leq$55 (vol %) and 45 (vol %)$\leq\beta\leq$65 (vol %).

As the value of $\alpha$ exceeds 75 (vol %) and the value of $\beta$ does not reach 25 (vol %), the specific dielectric constant $\in$r of the dielectric porcelain composition tends to grow large, and the temperature coefficient of resonance frequency (t f) tends to grow large in a positive direction. The increase in the specific dielectric constant $\in$r will render it difficult to enhance the characteristics of a multilayer type device joined to the BaO-rare earth oxide-$TiO_2$ base dielectric porcelain composition, and cause the temperature coefficient of resonance frequency ($\tau$ f) to grow large, rendering the resonance frequency of a high-frequency device likely to fluctuate with temperatures. As the value of $\alpha$ does not reach 15 (vol %) and the value of $\beta$ exceeds 85 (vol %), on the contrary, the temperature coefficient of resonance frequency ($\tau$ f) of the dielectric porcelain composition tends to grow large in a negative direction, leading to inconvenience that the resonance frequency of the high-frequency device is apt to fluctuate with temperatures.

Preferably in the present invention, MgO and $SiO_2$ contained as a part of the main component composition are contained in forsterite crystal form in the dielectric porcelain composition.

Whether or not the forsterite crystals are contained in the dielectric porcelain composition may be checked up by an X-ray diffractometry (XRD) system.

A dielectric porcelain composition containing a BaO—$Nd_2O_3$—$TiO_2$ base compound as a main component has a specific dielectric constant as high as $\in$r=55 to 105, whereas forsterite has a specific dielectric constant as low as $\in$r=6.8 in a single form. The dielectric porcelain composition here contains as the main components a BaO—$Nd_2O_3$—$TiO_2$ base compound and a forsterite crystal, and so can have a reduced specific dielectric constant.

In most cases, the temperature coefficient $\tau$f of resonance frequency of a dielectric porcelain composition containing a BaO—$Nd_2O_3$—$TiO_2$ base compound as a main component has a positive value, whereas forsterite has a negative temperature coefficient of resonance frequency of tf=−65 (ppm/K). The incorporation of the BaO—$Nd_2O_3$—$TiO_2$ base compound and forsterite crystal as the main components of the dielectric porcelain composition enables the positive temperature coefficient of resonance frequency to be canceled out by the negative temperature coefficient of resonance frequency so that the temperature coefficient of resonance frequency of the dielectric porcelain composition can be brought to near zero. Further, if the content of forsterite crystals in the main component composition is increased or decreased, it is then possible to regulate the temperature coefficient of resonance frequency of the dielectric porcelain composition here.

A dielectric porcelain composition containing a BaO—$Nd_2O_3$—$TiO_2$ base compound as a main component has a Q·f value of Q·f=about 2,000 to about 8,000 GHz, whereas forsterite has a dielectric loss as small as Q·f=200,000 GHz in a single form. The incorporation of the BaO—$Nd_2O_3$—$TiO_2$ base compound and forsterite crystal as the main components of the dielectric porcelain composition allows that composition to have a low dielectric loss.

The dielectric porcelain composition here contains the desired subordinate components added to the main component composition so that it can be fired at a temperature lower than the melting point of a conductor formed chiefly of Ag, an alloy containing Ag as a primary component or the like.

Explanation of the Subordinate Components

As already noted, the dielectric porcelain composition of the present invention contains as subordinate components a zinc oxide, a boron oxide, a copper oxide and a manganese oxide.

When those subordinate components are represented by aZnO, $bB_2O_3$, cCuO and dMnO, a, b, c and d indicative of the weight ratio (wt %) of each subordinate component relative to the aforesaid main component are within the ranges of 0.1 (wt %)$\leq$a$\leq$12.0 (wt %)

0.1 (wt %)$\leq$b$\leq$12.0 (wt %)

0.1 (wt %)$\leq$c$\leq$9.0 (wt %)

0.01 (wt %)$\leq$d$\leq$6.5 (wt %)

More specifically, it is required that the proportion of the zinc oxide contained relative to the main component composition be 0.1 (wt %)$\leq$a$\leq$17.0 (wt %), as calculated on ZnO basis. Preferably, 0.5 (wt %)≦a≦9.0 (wt %), and more preferably, 1.0 (wt %)≦a≦7.0 (wt %).

As the proportion of the zinc oxide contained relative to the main component composition does not reach 0.1 (wt %) as calculated on ZnO basis, the dielectric porcelain composition tends to have a slender effect on low-temperature sintering. As the proportion of the zinc oxide contained relative to the main component composition exceeds 12.0 (wt %) as calculated on ZnO basis, on the other hand, there are dielectric losses tending to grow large and the Q·f value tending to go down.

It is required that the proportion of the boron oxide contained relative to the main component composition be 0.1 (wt %)≦b≦12.0 (wt %), as calculated on $B_2O_3$ basis. Preferably, 0.5 (wt %)≦b≦9.0 (wt %), and more preferably, 1.0 (wt %)≦b≦7.0 (wt %).

As the proportion of the boron oxide contained relative to the main component composition does not reach 0.1 (wt %) as calculated on $B_2O_3$ basis, the dielectric porcelain composition tends to have a tenuous effect on low-temperature sintering. As the proportion of the boron oxide contained relative to the main component composition exceeds 12.0 (wt %) as calculated on $B_2O_3$ basis, on the other hand, there are dielectric losses tending to grow large and the Q·f value tending to go down.

It is required that the proportion of the copper oxide contained relative to the main component composition be 0.1 (wt %)≦c≦9.0 (wt %), as calculated on CuO basis. Preferably, 0.5 (wt %)≦c≦6.0 (wt %), and more preferably, 1.0 (wt %)≦c≦4.0 (wt %).

As the proportion of the copper oxide contained relative to the main component composition does not reach 0.1 (wt %) as calculated on CuO basis, the dielectric porcelain composition tends to have a slender effect on low-temperature sintering. As the proportion of the copper oxide contained relative to the main component composition exceeds 9.0 (wt %) as calculated on CuO basis, on the other hand, there are dielectric losses tending to grow large and the Q·f value tending to go down.

In the present invention, there is the manganese oxide added to the main component composition in addition to the aforesaid subordinate components so as to achieve further reductions of dielectric losses. It is thus required that the proportion of the manganese oxide added to the main component composition be 0.01 (wt %)≦d≦6.5 (wt %), as calculated on MnO basis. Preferably, 0.1 (wt %)≦d≦6.0 (wt %), and more preferably, 0.5 (wt %)≦d≦3.0 (wt %).

As the proportion of the manganese oxide contained in the main component composition does not reach 0.01 (wt %) as calculated on MnO basis, there would be no effect on dielectric loss reductions. As the proportion of the manganese oxide contained in the main component composition exceeds 6.5 (wt %), on the other hand, there is an ailment such as increased dielectric losses.

The dielectric porcelain composition of the present invention contains BaO, $Nd_2O_3$, $TiO_2$, MgO and $SiO_2$ as the main components, and ZnO, $B_2O_3$, CuO and MnO as the subordinate components. Especially if MgO and $SiO_2$ (forsterite crystal in particular) are contained as one main component, then its specific dielectric constant can be lower than the general specific dielectric constant of BaO-rare earth oxide-$TiO_2$ base dielectric porcelain compositions. The dielectric porcelain composition of the present invention also has low-temperature sintering capability so that it can be co-fired with a conductor formed of Ag, an alloy containing Ag as a main ingredient or the like, and makes it possible to reduce resonance frequency changes with temperature changes.

Further, the incorporation of MnO as the subordinate component contributes a lot more to improvements in the dielectric loss of the BaO-rare earth-$TiO_2$ base dielectric porcelain composition.

The material of the dielectric porcelain composition according to the present invention is similar to that of the BaO-rare earth oxide-$TiO_2$ base dielectric porcelain composition, and so its shrinkage behavior and linear expansion coefficient at the time of firing are equivalent to those of the BaO-rare earth oxide-$TiO_2$ base dielectric porcelain composition. In other words, even when the dielectric porcelain composition of the present invention is joined to and fired with the BaO-rare earth oxide-$TiO_2$ base dielectric porcelain composition into a multilayer type device, defects are less likely to occur at the interface. Thus, the dielectric porcelain composition of the present invention can be joined to the BaO-rare earth oxide-$TiO_2$ base dielectric porcelain composition to fabricate a multilayer type device of high performance. Note here that the dielectric porcelain composition according to the present invention may contain other compounds and elements within such a range that the objects and advantages of the present invention are achievable.

To provide a less expensive yet smaller device, the dielectric porcelain composition according to the present invention must have as an internal conductor a conductor formed of less expensive Ag, an alloy containing Ag as a main component or the like. Hence, the dielectric porcelain composition must have low-temperature sintering capability enough to enable firing to be carried out at a temperature lower than the melting point of the conductor used as the internal conductor. Because the dielectric characteristics of the dielectric porcelain composition are affected by sintering temperatures, too, the firing temperature must be 800° C. to 950° C., and preferably 850° C. to 900° C.

An account of the dielectric loss of a dielectric porcelain composition that is an important consideration in the present invention is now given.

As an alternate current is applied to an ideal dielectric material, an electric current and a voltage have a phase difference of 90°. As the frequency of the alternate current grows high to a point where there is a high frequency, however, the polarization of the dielectric material or the orientation of polar molecules can never respond to changes in a high-frequency electric field, or an electric flux density has a phase delay with respect to an electric field due to the conduction of electrons or ions with the result that the electric current and the voltage come to have a phase other than 90°. The dielectric loss is a phenomenon in which a part of the energy of the aforesaid high frequency dissipates off in the form of heat. The magnitude of dielectric loss is represented by a reciprocal Q (Q=1/tanδ) of the tangent tanδ of a loss angle δ that is a difference between the phase difference of a real current and voltage and the 90° phase difference of an ideal current and voltage. For the estimation of dielectric loss of the dielectric porcelain composition according to the present invention, the value of Q·f that is the product of the aforesaid Q and resonance frequency is used. The smaller the dielectric loss, the larger the value of Q·f grows, and the larger the dielectric loss, the smaller the value of Q·f becomes. The dielectric loss is tantamount to the power loss of a high-frequency device, and so there is a demand for a dielectric porcelain composition having a greater Q·f value. In addition, a multilayer type device must have limited power losses so as to have higher performance; that is, the Q·f value must be at least 4,500 GHz, and preferably 5,000 GHz or greater.

One of the objects of the present invention is to make it possible to form a multilayer type device by joining the dielectric porcelain composition of the present invention to a BaO-rare earth oxide-TiO$_2$ base dielectric porcelain composition having a high specific dielectric constant. In other words, one technical challenge of the present invention is to provide a dielectric porcelain composition having a specific dielectric constant lower than that of that BaO-rare earth oxide-TiO$_2$ base dielectric porcelain composition. Some BaO-rare earth oxide-TiO$_2$ base dielectric porcelain compositions have been reported to have a specific dielectric constant of 50 to 105; however, the dielectric porcelain composition of the present invention is required to have a specific dielectric constant ∈r of up to 50. For a multilayer type device of higher performance, the dielectric constant ∈r should be preferably up to 40, and more preferably up to 30, and even more preferably 20 to 30.

An account of the temperature coefficient tf (ppm/K) of resonance frequency of a dielectric porcelain composition that is another important consideration in the present invention is now given.

The temperature coefficient tf (ppm/K) of resonance frequency of a dielectric porcelain composition is worked out from the following equation (1).

$$\tau f = [f_T - f_{ref}/f_{ref}(T-T_{ref})] \times 1,000,000 \text{ (ppm/K)} \quad (1)$$

Here $f_T$ is indicative of a resonance frequency (kHz) at a temperature T, and $f_{ref}$ is indicative of a resonance frequency (kHz) at a reference temperature $T_{ref}$.

The magnitude of the absolute value of the temperature coefficient Tf of resonance frequency means the magnitude of the quantity of change in the resonance frequency of a dielectric porcelain composition relative to temperature changes. For high-frequency devices like capacitors and dielectric filters, it is required to diminish resonance frequency changes with temperatures, and for the dielectric porcelain composition of the present invention, too, it is required to diminish the absolute value of the temperature coefficient τf of resonance frequency.

When the dielectric porcelain composition of the present invention is used for a dielectric resonator, the temperature coefficient τf of resonance frequency must be in the range of −40 (ppm/K) to +40 (ppm/K) so as to obtain further reductions in resonance frequency changes with temperatures. Further, for multilayer type devices of higher performance, the temperature coefficient τf must be in the range of −25 (ppm/K) to +25 (ppm/K), and preferably −10 (ppm/K) to +10 (ppm/K).

The estimation of low-temperature firing capability of a dielectric porcelain composition may be made by firing the starting components at a gradually decreasing temperature to find out whether sintering proceeds to a level at which the desired dielectric characteristics are measurable.

The estimation of dielectric characteristics of a dielectric porcelain composition may be made by taking measurements of dielectric loss, resonance frequency changes with temperature changes (the temperature coefficient of resonance frequency) and specific dielectric constant pursuant to JIS R 1627 1996 (Testing Method for the Dielectric Characteristics of Fine Ceramics in Microwave Applications).

Explanation of Dielectric Porcelain Composition Production Process

Next, the production process for the dielectric porcelain composition of the present invention is explained.

In the production process for the dielectric porcelain composition of the present invention, the barium-containing raw material, the neodymium-containing raw material, the titanium-containing raw material, the magnesium-containing raw material, the silicon-containing raw material, the zinc-containing raw material, the boron-containing raw material, the copper-containing raw material and the manganese-containing raw material are fired together into a BaO—Nd$_2$O$_3$—TiO$_2$—MgO—SiO$_2$—ZnO—B$_2$O$_3$—CuO—MnO base dielectric porcelain composition, wherein forsterite (2MgO.SiO$_2$) powders are used as the magnesium-containing raw material and the silicon-containing raw material.

For production raw materials for the dielectric porcelain composition of the present invention, oxides and/or compounds that turn into oxides upon firing are used. Examples of the compounds that turn into oxides upon firing are carbonates, nitrates, oxalates, hydroxides, sulfides, and organic metal compounds.

Figure 2:
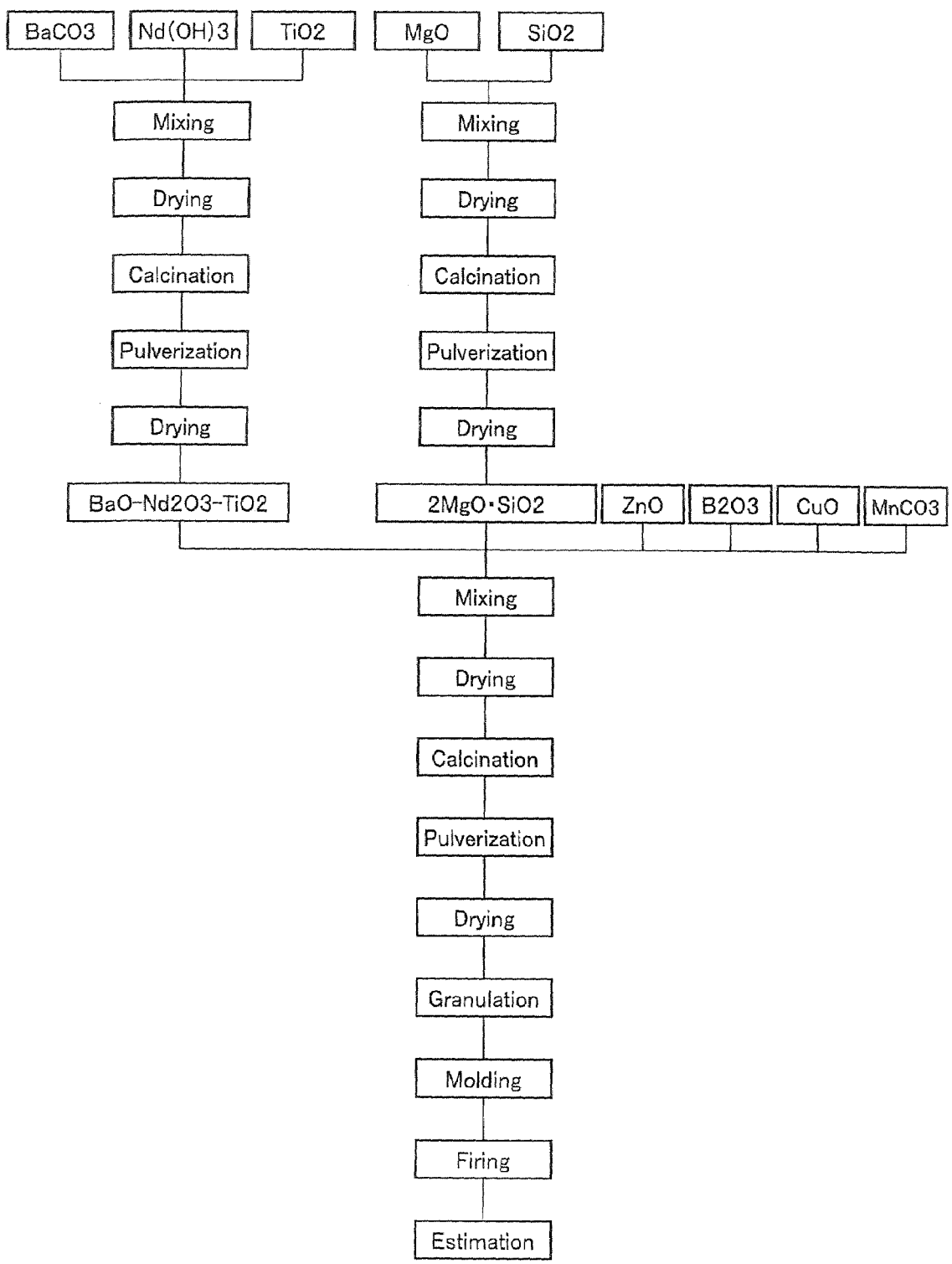
FIG. 2 is illustrative of the process steps for producing the dielectric porcelain composition of the invention according to the second group of this application.

FIG. 2 is illustrative of one embodiment of the dielectric porcelain composition production process according to the present invention.

The dielectric porcelain composition production process according to the present invention is now explained in more details with reference to FIG. 2.

First of all, for instance, barium carbonate, neodymium hydroxide and titanium oxide that are a part of the main component composition are provided at the ready. Then, they are weighed and mixed together in given amounts, and calcined.

Mixing here is carried out such that the molar ratios x, y and z in the composition formula xBaO.yNd$_2$O$_3$.zTiO$_2$ satisfy the above composition relations.

Barium carbonate, neodymium oxide and titanium oxide may be mixed either dry or wet. For instance, they may be mixed by means of a ball mill in a mixing mode using purified water or a solvent such as ethanol. The mixing time may be about 4 hours to about 24 hours.

Thereafter, the mixed raw material is dried at 100° C. to 200° C., preferably 120° C. to 140° C. for about 12 hours to about 36 hours, followed by calcination.

Calcination is a step for the synthesis of a BaO—Nd$_2$O$_3$—TiO$_2$ base compound from a mixture material comprising barium carbonate, neodymium hydroxide and titanium oxide. That step is preferably carried out at a calcination temperature of 1,100° C. to 1,500° C., especially 1,100° C. to 1,350° C. for about 1 hour to about 24 hours.

The synthesized BaO—Nd$_2$O$_3$—TiO$_2$ base compound is pulverized into powders, and dried. Pulverization may be carried out either dry or wet, for instance, by means of a ball mill in a pulverization mode using purified water or a solvent such as ethanol. The pulverization time may be about 4 hours to about 24 hours.

The powders obtained by pulverization may be dried at a drying temperature of 100° C. to 200° C., preferably 120° C. to 140° C. for about 12 hours to about 36 hours. Thus, BaO—Nd$_2$O$_3$—TiO$_2$ base compound powders may be obtained.

Then, magnesium oxide and silicon oxide that are another part of the main component composition are at the ready. Then, they are weighed and mixed together in given amounts, and calcined. Magnesium oxide and silicon oxide may be mixed either dry or wet. For instance, they may be mixed by means of a ball mill in a mixing mode using purified water or a solvent such as ethanol. The mixing time may be about 4 hours to about 24 hours.

Thereafter, the mixed raw material is dried at 100° C. to 200° C., preferably 120° C. to 140° C. for about 12 hours to about 36 hours, followed by calcination.

Calcination is a step for the synthesis of a forsterite crystal from a mixture of magnesium oxide and silicon oxide. That step is preferably carried out at a calcination temperature of 1,100° C. to 1,500° C., especially 1,100° C. to 1,350° C. for about 1 hour to about 24 hours.

The incorporation as the main components of the BaO—Nd$_2$O$_3$—TiO$_2$ base compound and the forsterite crystal ensures that, by the effect of the forsterite crystal, the specific dielectric constant ∈r of the dielectric porcelain composition is let go down, and the temperature coefficient of resonance frequency is brought to near zero, ending up with reduced dielectric losses. To enhance the effect of forsterite added, it is required to reduce a portion of the aforesaid raw material that does not turn into forsterite and remains unreacted; it is desired that the aforesaid raw material mixing be carried out such that the number of moles of magnesium is twice as many as that of silicon.

The synthesized forsterite is pulverized into powders, and dried. Pulverization may be carried out either dry or wet, for instance, by means of a ball mill in a pulverization mode using purified water or a solvent such as ethanol. The pulverization time may be about 4 hours to about 24 hours.

The powders obtained by pulverization may be dried at a drying temperature of 100° C. to 200° C., preferably 120° C. to 140° C. for about 12 hours to about 36 hours. Thus, forsterite powders may be obtained.

Instead of obtaining forsterite powders by the synthesis and pulverization of forsterite from the magnesium-containing raw material and the silicon-containing raw material as shown in FIG. 2, it is acceptable to use commercially available forsterite. That is, a commercial forsterite product may be pulverized by means of a ball mill in a pulverization mode using purified water or a solvent such as ethanol, and then dried at 100° C. to 200° C., preferably 120° C. to 140° C. for about 12 hours to about 36 hours into forsterite powders.

Next, the BaO—Nd$_2$O$_3$—TiO$_2$ base compound powders, the forsterite powders, and zinc oxide, boron oxide, copper oxide and manganese carbonate that are weighed in such a given range as to satisfy the aforesaid subordinate component composition are mixed together into a raw mixture powder material.

Mixing may be carried out either dry or wet, for instance, by means of a ball mill in a mixing mode using purified water or a solvent such as ethanol. The mixing time may be about 4 hours to about 24 hours.

After the completion of mixing, the raw mixture powder material was dried at 100° C. to 200° C., preferably 120° C. to 140° C. for about 12 hours to about 36 hours.

Next, the raw mixture powder material is again calcined at a temperature lower than the firing temperature, for instance, 700° C. to 800° C. for about 1 to about 10 hours. With that calcination carried out at a lower temperature, forsterite does not melt so that a crystal form of forsterite can be incorporated in the dielectric porcelain composition. Thereafter, the calcined raw mixture powder material is pulverized and dried. Pulverization is carried out either dry or wet, for instance, by means of a ball mill in a pulverization mode using purified water or a solvent such as ethanol. The pulverization time may be about 4 hours to about 24 hours. The powders obtained by pulverization may be dried at a drying temperature of 100° C. to 200° C., preferably 120° C. to 140° C. for about 12 hours to about 36 hours. Thus, by carrying out the second calcination and pulverization, the main and subordinate components can be placed in a uniform state so that the dielectric porcelain composition here can be obtained in a uniform state at later production steps.

After mixing the powders obtained as described above with an organic binder based on, for instance, polyvinyl alcohol, acryl, and ethyl cellulose, the mixture is molded in a desired shape, followed by sintering by firing of the molded product. Molding may be carried out either in a wet mode such as a sheet process or printing, or in a dry mode such as press molding; appropriate selection may be from molding processes depending on the desired shape. Firing is preferably carried out in an oxygen atmosphere such as air, and the firing temperature must be lower than the melting point of Ag or an alloy containing Ag as a main component that forms a conductor that is used as an internal electrode, for instance, at 800° C. to 950° C., preferably 850° C. to 900° C.

A multilayer type device is fabricated of a multilayer ceramic substrate comprising a plurality of ceramic layers, each with a built-in dielectric device such as a capacitor or inductor. The multilayer ceramic substrate is fabricated by stacking and co-firing a plurality of green sheets of ceramic material having different dielectric characteristics while conductors as internal conductors are located at interfaces optionally with through-holes. By stacking a green sheet molded of the dielectric porcelain composition of the present invention on a green sheet molded of a general BaO-rare earth oxide-TiO$_2$ base dielectric porcelain composition known in the art, it is possible to fabricate a multilayer ceramic substrate using the dielectric porcelain composition of the present invention.

The present invention is now explained in more details with reference to specific examples.

EXPERIMENTAL EXAMPLE 2-1

Sample Preparation and How to Measure the Desired Physical Properties

Such various dielectric porcelain composition samples as set out in Table 2 were prepared in the following manners. The definitions of α, β, x, y and z that specify the main component composition and a, b and c that specify the amounts of the subordinate components added have been mentioned.

A basic production process is now explained specifically with reference to Sample No. 2-3 that is an inventive sample.

First, the starting materials for the main components BaCO$_3$, Nd(OH)$_3$ and TiO$_2$ were weighed such that x, y and z, i.e., the molar ratios of BaO, Nd$_2$O$_3$ and TiO$_2$ in the BaO—Nd$_2$O$_3$—TiO$_2$ base compound after calcination had such values as set out in the main component composition column of Sample No. 2-3 in Table 2, given later. That is, the starting materials were weighed such that x=18.5 (mol %), y=15.4 (mol %) and z=66.1 (mol %).

Purified water was added to the weighed starting materials at a slurry concentration of 25%, which were in turn wet mixed in a ball mill for 16 hours, followed by drying at 120° C. for 24 hours. The dried powders were calcined in air (1,200° C., 4 hours). Purified water was added to the BaO—Nd$_2$O$_3$—TiO$_2$ base compound after calcination at a slurry concentration of 25%, which was then pulverized in a ball mill for 16 hours, and thereafter dried at 120° C. for 24 hours to prepare BaO—Nd$_2$O$_3$—TiO$_2$ base compound powders.

Then, the remaining starting materials for the main components, that is, MgO and SiO$_2$ were weighed such that the number of moles of magnesium was twice as large as that of silicon. Purified water was added to them at a slurry concentration of 25%, which were wet mixed in a ball mill for 16 hours, followed by drying at 120° C. for 24 hours.

The dried powders were calcined in air (1,200° C., 3 hours). Purified water was added to the forsterite after calcination at a slurry concentration of 25%, which was in turn pulverized in a ball mill for 16 hours, and thereafter dried at 120° C. for 24 hours to prepare forsterite powders.

Next, ZnO, B$_2$O$_3$, CuO and MnCO$_3$ that were the raw materials for the subordinate components were at the ready.

Then, the pulverized BaO—Nd$_2$O$_3$—TiO$_2$ base compound powders and the pulverized forsterite powders were blended together at such mixing ratios as set out in Table 2, given later, and the subordinate components were blended with those main components at such blending ratios as set out at the amount-of-subordinate-component-added column of Sample No. 2-3 in Table 2 to obtain raw mixture powders. Specifically, weighing was done such that α=5 (vol %), β=45 (vol %), a=6.0 (wt %), b=4.5 (wt %), c=3.0 (wt %) and d=0.1 (wt %), purified water was added at a slurry concentration of 25%, a 16-hour wet mixing was carried out in a ball mill, and drying was performed at 120° C. for 24 hours to obtain the raw mixture powders.

The thus obtained raw mixture powders were again calcined in air (750° C., 2 hours) to obtain calcined powders.

Purified water was added to the resultant calcined powders in such a way as to provide a slurry concentration of 25%, which were again wet pulverized in a ball mill for 16 hours, and thereafter dried at 120° C. for 24 hours. An aqueous solution of polyvinyl alcohol was added as a binder to the re-pulverized powders for granulation, and the resulting granules were molded into a columnar shape of 12 mm in diameter and 6 mm in height. The molded column was fired at the temperature indicated at the firing temperature column of Sample No. 2-3 in Table 2, viz., 880° C. for 1 hour to obtain a dielectric porcelain composition.

The thus obtained dielectric porcelain composition was trimmed off at its surface to prepare a columnar pellet of 10 mm in diameter and 5 mm in height as a measuring Sample No. 2-3.

Dielectric porcelain composition Sample No. 2-3 was measured for a specific dielectric constant ∈r, a Q·f value and a temperature coefficient τf of resonance frequency pursuant to JIS R 1627 1996 (Testing Method for the Dielectric Characteristics of Fine Ceramics in Microwave Applications). Measurements were carried out at a frequency of 8.2 GHz, and resonance frequency was measured at a temperature ranging from −40° C. to 85° C. to work out the temperature coefficient τf of resonance frequency from the aforesaid calculation equation (1).

From the fact that each physical property could be measured as indicated in Table 2, Sample No. 2-3 is found to have been fully sintered at the low temperature of 880° C. Note here that the sample is found to have such physical properties as indicated by a specific dielectric constant of ∈r=25.4, a Q·f value of 5,420 (GHz) and a temperature coefficient of resonance frequency of τf=3 (ppm/K).

Following the preparation process of such Sample No. 2-3, various such samples as set out in Table 2 were prepared. Samples that could be sintered were measured for the specific dielectric constant ∈r, the Q·f value (measured at a measuring frequency range of 7.8 to 9.3 GHz) and the temperature coefficient τf of resonance frequency.

The results are summed up in Table 2, given below.

Note here that the asterisked (*) samples stand for "reference examples", not "comparative examples". The "reference examples" are equivalent to the invention according to the first group accomplished by the inventors of this application.

TABLE 2

| Sample No. | Main Component Composition | | | | | Amounts of Subordinate Components Added | | | |
|---|---|---|---|---|---|---|---|---|---|
| | α | β | x | y | z | a | b | c | d |
| *2-1 | 55 | 45 | 18.5 | 15.4 | 66.1 | 6.0 | 4.5 | 3.0 | — |
| *2-2 | 55 | 45 | 18.5 | 15.4 | 66.1 | 6.0 | 4.5 | 3.0 | — |
| 2-3 | 55 | 45 | 18.5 | 15.4 | 66.1 | 6.0 | 4.5 | 3.0 | 0.1 |
| 2-4 | 55 | 45 | 18.5 | 15.4 | 66.1 | 6.0 | 4.5 | 3.0 | 0.1 |
| 2-5 | 55 | 45 | 18.5 | 15.4 | 66.1 | 6.0 | 4.5 | 3.0 | 0.5 |
| 2-6 | 55 | 45 | 18.5 | 15.4 | 66.1 | 6.0 | 4.5 | 3.0 | 0.5 |
| 2-7 | 55 | 45 | 18.5 | 15.4 | 66.1 | 6.0 | 4.5 | 3.0 | 1.0 |
| 2-8 | 55 | 45 | 18.5 | 15.4 | 66.1 | 6.0 | 4.5 | 3.0 | 1.0 |
| 2-9 | 55 | 45 | 18.5 | 15.4 | 66.1 | 6.0 | 4.5 | 3.0 | 1.5 |
| 2-10 | 55 | 45 | 18.5 | 15.4 | 66.1 | 6.0 | 4.5 | 3.0 | 1.5 |
| 2-11 | 55 | 45 | 18.5 | 15.4 | 66.1 | 6.0 | 4.5 | 3.0 | 2.0 |
| 2-12 | 55 | 45 | 18.5 | 15.4 | 66.1 | 6.0 | 4.5 | 3.0 | 2.0 |
| 2-13 | 55 | 45 | 18.5 | 15.4 | 66.1 | 6.0 | 4.5 | 3.0 | 3.0 |
| 2-14 | 55 | 45 | 18.5 | 15.4 | 66.1 | 6.0 | 4.5 | 3.0 | 3.0 |
| 2-15 | 55 | 45 | 18.5 | 15.4 | 66.1 | 6.0 | 4.5 | 3.0 | 4.5 |
| 2-16 | 55 | 45 | 18.5 | 15.4 | 66.1 | 6.0 | 4.5 | 3.0 | 4.5 |
| 2-17 | 55 | 45 | 18.5 | 15.4 | 66.1 | 6.0 | 4.5 | 3.0 | 6.0 |
| 2-18 | 55 | 45 | 18.5 | 15.4 | 66.1 | 6.0 | 4.5 | 3.0 | 6.0 |
| *2-19 | 55 | 45 | 18.5 | 15.4 | 66.1 | 6.0 | 4.5 | 3.0 | 7.5 |
| *2-20 | 55 | 45 | 18.5 | 15.4 | 66.1 | 6.0 | 4.5 | 3.0 | 7.5 |

| Sample No. | Firing Temp. (° C.) | Dielectric characteristics | | |
|---|---|---|---|---|
| | | ∈r | Q · f (GHz) | τf (ppm/k) |
| *2-1 | 880 | 25.4 | 5,044 | 2 |
| *2-2 | 900 | 26.6 | 5,124 | 1 |
| 2-3 | 880 | 25.4 | 5,420 | 3 |
| 2-4 | 900 | 26.5 | 5,272 | 3 |
| 2-5 | 880 | 25.3 | 5,748 | 4 |
| 2-6 | 900 | 26.3 | 5,513 | 4 |
| 2-7 | 880 | 25.2 | 6,012 | 5 |
| 2-8 | 900 | 26.1 | 5,735 | 5 |
| 2-9 | 880 | 25.1 | 5,992 | 5 |
| 2-10 | 900 | 26.0 | 5,811 | 5 |
| 2-11 | 880 | 25.0 | 5,946 | 5 |
| 2-12 | 900 | 25.9 | 5,752 | 5 |
| 2-13 | 880 | 24.9 | 5,876 | 4 |
| 2-14 | 900 | 25.8 | 5,701 | 4 |
| 2-15 | 880 | 24.4 | 5,368 | 3 |
| 2-16 | 900 | 25.5 | 5,197 | 3 |
| 2-17 | 880 | 23.9 | 5,096 | 1 |
| 2-18 | 900 | 25.0 | 4,915 | 0 |
| *2-19 | 880 | 23.3 | 4,587 | −4 |
| *2-20 | 900 | 24.2 | 4,394 | −4 |

| Sample No. | Main Component Composition | | | | | Amounts of Subordinate Components Added | | | |
|---|---|---|---|---|---|---|---|---|---|
| | α | β | x | y | z | a | b | c | d |
| 2-21 | 55 | 45 | 9.0 | 24.4 | 66.6 | 6.0 | 4.5 | 3.0 | 1.5 |
| *2-22 | 55 | 45 | 9.0 | 24.4 | 66.6 | 6.0 | 4.5 | 3.0 | — |
| 2-23 | 55 | 45 | 22.0 | 11.4 | 66.6 | 6.0 | 4.5 | 3.0 | 1.5 |
| *2-24 | 55 | 45 | 22.0 | 11.4 | 66.6 | 6.0 | 4.5 | 3.0 | — |
| 2-25 | 55 | 45 | 17.0 | 9.0 | 74.0 | 6.0 | 4.5 | 3.0 | 1.5 |
| *2-26 | 55 | 45 | 17.0 | 9.0 | 74.0 | 6.0 | 4.5 | 3.0 | — |
| 2-27 | 55 | 45 | 9.4 | 29.0 | 61.6 | 6.0 | 4.5 | 3.0 | 1.5 |
| *2-28 | 55 | 45 | 9.4 | 29.0 | 61.6 | 6.0 | 4.5 | 3.0 | — |
| 2-29 | 55 | 45 | 18.5 | 15.4 | 66.1 | 0.1 | 4.5 | 3.0 | 1.5 |
| *2-30 | 55 | 45 | 18.5 | 15.4 | 66.1 | 0.1 | 4.5 | 3.0 | — |
| 2-31 | 55 | 45 | 18.5 | 15.4 | 66.1 | 12.0 | 4.5 | 3.0 | 1.5 |
| *2-32 | 55 | 45 | 18.5 | 15.4 | 66.1 | 12.0 | 4.5 | 3.0 | — |
| 2-33 | 55 | 45 | 18.5 | 15.4 | 66.1 | 6.0 | 0.1 | 3.0 | 1.5 |
| *2-34 | 55 | 45 | 18.5 | 15.4 | 66.1 | 6.0 | 0.1 | 3.0 | — |
| 2-35 | 55 | 45 | 18.5 | 15.4 | 66.1 | 6.0 | 12.0 | 3.0 | 1.5 |
| *2-36 | 55 | 45 | 18.5 | 15.4 | 66.1 | 6.0 | 12.0 | 3.0 | — |
| 2-37 | 55 | 45 | 18.5 | 15.4 | 66.1 | 6.0 | 4.5 | 0.1 | 1.5 |

TABLE 2-continued

| *2-38 | 55 | 45 | 18.5 | 15.4 | 66.1 | 6.0 | 4.5 | 0.1 | — |
| 2-39 | 55 | 45 | 18.5 | 15.4 | 66.1 | 6.0 | 4.5 | 9.0 | 1.5 |
| *2-40 | 55 | 45 | 18.5 | 15.4 | 66.1 | 6.0 | 4.5 | 9.0 | — |

| Sample No. | Firing Temp. (° C.) | Dielectric characteristics | | |
| --- | --- | --- | --- | --- |
| | | $\epsilon r$ | $Q \cdot f$ (GHz) | $\tau f$ (ppm/k) |
| 2-21 | 900 | 20.2 | 4,451 | −37 |
| *2-22 | 900 | 20.3 | 4,015 | −38 |
| 2-23 | 900 | 27.8 | 4,500 | −28 |
| *2-24 | 900 | 28.2 | 4,085 | −30 |
| 2-25 | 900 | 28.6 | 4,509 | 7 |
| *2-26 | 900 | 28.9 | 4,096 | 6 |
| 2-27 | 900 | 20.3 | 4,597 | −39 |
| *2-28 | 900 | 20.5 | 4,195 | −40 |
| 2-29 | 900 | 23.5 | 5,147 | 8 |
| *2-30 | 900 | 23.8 | 4,824 | 7 |
| 2-31 | 900 | 25.1 | 4,486 | −3 |
| *2-32 | 900 | 25.5 | 4,125 | −5 |
| 2-33 | 900 | 24.3 | 4,921 | 7 |
| *2-34 | 900 | 24.6 | 4,700 | 6 |
| 2-35 | 900 | 20.0 | 4,440 | 1 |
| *2-36 | 900 | 20.3 | 4,022 | −2 |
| 2-37 | 900 | 25.3 | 5,401 | 6 |
| *2-38 | 900 | 25.8 | 4,922 | 4 |
| 2-39 | 900 | 25.1 | 4,574 | −9 |
| *2-40 | 900 | 25.5 | 4,068 | −11 |

The advantages of the present invention would be evident from the results of Table 2. That is, the present invention provides a dielectric porcelain composition that contains as main components BaO, $Nd_2O_3$, $TiO_2$, MgO and $SiO_2$ at the given ratios and as subordinate components ZnO, $B_2O_3$ and CuO at the given ratios, and further comprises MnO as an additional subordinate component. It is thus possible to obtain a dielectric porcelain composition having a low-temperature sintering capability stable and reliable enough to permit a conductor formed of Ag, an alloy containing Ag as a main component or the like to be used as an internal conductor. Limited resonance frequency changes with temperature changes, specific dielectric constants that are lower than those of BaO-rare earth oxide-$TiO_2$ base dielectric porcelain compositions, and limited dielectric losses are achievable as well.

(3) Explanation of the Invention According to the Third Group of This Application The best mode for carrying out the invention according to the third group of this application is now explained. First of all, the arrangement of the dielectric porcelain composition according to the third group is explained.

Explanation of the Dielectric Porcelain Composition According to the Third Group The dielectric porcelain composition of the present invention comprises a main component composition represented by a composition formula $\{\alpha(xBaO.yNd_2O_3.zTiO_2)+\beta(2MgO.SiO_2)\}$.

Further, the dielectric porcelain composition of the present invention comprises a zinc oxide, a boron oxide, a copper oxide and an alkaline earth metal oxide as subordinate components relative to that main component composition.

In what follows, the main component composition, and the subordinate component composition of the dielectric porcelain composition according to the present invention are explained in further details. First of all, the main component composition is explained.

Explanation of the Main Component Composition

As already noted, the dielectric porcelain composition of the present invention contains the main component composition represented by the composition formula $\{\alpha(xBaO.yNd_2O_3.zTiO_2)+\beta(2MgO.SiO_2)\}$, wherein x, y and z indicative of the molar ratios (mol %) of BaO, $Nd_2O_3$ and $TiO_2$ are in the ranges of 9 (mol %)≦x≦22 (mol %)

9 (mol %)≦y≦29 (mol %)

61 (mol %)≦z≦74 (mol %)

and have a relation of x+y+z=100 (mol %).

Further, α and β indicative of the volume ratio (vol %) of each component in that main component composition are in the ranges of 15 (vol %)≦α≦75 (vol %)

25 (vol %)≦β≦85 (vol %)

and have a relation of α+β=100 (vol %).

It is required that the proportion x of BaO contained be within the aforesaid range, that is, 9 (mol %)≦x≦22 (mol %). Preferably, 10 (mol %)≦x≦19 (mol %), and more preferably, 14 (mol %)≦x≦19 (mol %).

As the proportion of BaO contained does not reach 9 (mol %), there are dielectric losses tending to grow large and the Q·f value tending to go down, resulting in an increase in the power loss of a high-frequency device. As the proportion of BaO contained exceeds 22 (mol %), on the other hand, low-temperature sintering capability tends to become worse, resulting in inability to form any dielectric porcelain composition. Otherwise, the Q·f value goes further down, leading to inconvenience that the power loss of the high-frequency device grows large.

It is required that the proportion of $Nd_2O_3$ contained be within the aforesaid range, that is, 9 (mol %)≦y≦29 (mol %). Preferably, 9 (mol %)≦y≦22 (mol %), and more referably, 12 (mol %)≦y≦17 (mol %).

As the proportion of $Nd_2O_3$ contained does not reach 9 (mol %), there are dielectric losses tending to grow large and the Q·f value tending to go down, resulting in an increase in the power loss of a high-frequency device. As the proportion of $Nd_2O_3$ contained exceeds 29 (mol %), on the other hand, dielectric losses tend to grow large, and the Q·f value tends to go down, and the temperature coefficient of resonance frequency (τ f) to tend to grow large in a negative direction as well. Consequently, the power loss of the high-frequency device will grow large, and the resonance frequency of the high-frequency device will be likely to fluctuate with temperatures.

It is required that the proportion of $TiO_2$ contained be within the aforesaid range, that is, 61 (mol %)≦z≦74 (mol %). Preferably, 61.5 (mol %)≦z≦74 (mol %), and more preferably, 65 (mol %)≦z≦71 (mol %).

As the proportion of $TiO_2$ contained does not reach 61 (mol %), dielectric losses grow large, which will cause the Q·f value to tend to go down, and the temperature coefficient of resonance frequency (τ f) to tend to grow large in a negative direction as well. Consequently, the power loss of a high-frequency device will grow large, and the resonance frequency of the high-frequency device will be likely to fluctuate with temperatures. As the proportion of $TiO_2$ contained exceeds 74 (mol %), on the other hand, low-temperature sintering capability becomes worse, which will tend to result in inability to form any dielectric porcelain composition.

In the composition formula for the aforesaid main component composition, α and β are indicative of the volume ratios of (1) BaO, $Nd_2O_3$ and $TiO_2$ and (2) MgO and $SiO_2$.

As already noted, α and β are in the ranges of 15 (vol %)$\leq$α$\leq$75 (vol %)

25 (vol %)$\leq$β$\leq$85 (vol %)

and have a relation of α+β=100 (vol %). Preferably, 25 (vol %)$\leq$α$\leq$65 (vol %) and 35 (vol %)$\leq$β$\leq$75 (vol %), and more preferably, 35 (vol %)$\leq$α$\leq$55 (vol %) and 45 (vol %)$\leq$β$\leq$65 (vol %).

As the value of α exceeds 75 (vol %) and the value of β does not reach 25 (vol %), the specific dielectric constant ∈r of the dielectric porcelain composition tends to grow large, and the temperature coefficient of resonance frequency (t f) tends to grow large in a positive direction. The increase in the specific dielectric constant ∈r will render it difficult to enhance the characteristics of a multilayer type device joined to the BaO-rare earth oxide-$TiO_2$ base dielectric porcelain composition, and cause the temperature coefficient of resonance frequency (τ f) to grow large, rendering the resonance frequency of a high-frequency device likely to fluctuate with temperatures. As the value of α does not reach 15 (vol %) and the value of β exceeds 85 (vol %), on the contrary, the temperature coefficient of resonance frequency (τ f) of the dielectric porcelain composition tends to grow large in a negative direction, leading to inconvenience that the resonance frequency of the high-frequency device is apt to fluctuate with temperatures.

Preferably in the present invention, MgO and $SiO_2$ contained as a part of the main component composition are contained in forsterite crystal form in the dielectric porcelain composition.

Whether or not the forsterite crystal is contained in the dielectric porcelain composition may be checked up by an X-ray diffractometry (XRD) system.

A dielectric porcelain composition containing a BaO—$Nd_2O_3$—$TiO_2$ base compound as a main component has a specific dielectric constant as high as ∈r=55 to 105, whereas forsterite has a specific dielectric constant as low as ∈r=6.8 in a single form. The dielectric porcelain composition here contains as the main components a BaO—$Nd_2O_3$—$TiO_2$ base compound and a forsterite crystal, and so can have a reduced specific dielectric constant.

In most cases, the temperature coefficient τf of resonance frequency of a dielectric porcelain composition containing a BaO—$Nd_2O_3$—$TiO_2$ base compound as a main component has a positive value, whereas forsterite has a negative temperature coefficient of resonance frequency of tf=−65 (ppm/K). The incorporation of the BaO—$Nd_2O_3$—$TiO_2$ base compound and forsterite crystal as the main components of the dielectric porcelain composition enables the positive temperature coefficient of resonance frequency to be canceled out by the negative temperature coefficient of resonance frequency so that the temperature coefficient of resonance frequency of the dielectric porcelain composition can be brought to near zero. Further, if the content of forsterite crystals in the main component composition is increased or decreased, it is then possible to regulate the temperature coefficient of resonance frequency of the dielectric porcelain composition here.

A dielectric porcelain composition containing a BaO—$Nd_2O_3$—$TiO_2$ base compound as a main component has a Q·f value of Q·f=about 2,000 to about 8,000 GHz, whereas forsterite has a dielectric loss as small as Q·f=200,000 GHz in a single form. The incorporation of the BaO—$Nd_2O_3$—$TiO_2$ base compound and forsterite crystal as the main components of the dielectric porcelain composition allows that composition to have a low dielectric loss.

The dielectric porcelain composition here contains the desired subordinate components added to the main component composition so that it can be fired at a temperature lower than the melting point of a conductor formed of Ag, an alloy containing Ag as a primary component or the like.

Explanation of the Subordinate Components

As already noted, the dielectric porcelain composition of the present invention contains as the subordinate components a zinc oxide, a boron oxide, a copper oxide and an alkaline earth metal oxide.

When those subordinate components are represented by aZnO, $bB_2O_3$, cCuO and dRO where R is an alkaline earth metal, a, b, c and d indicative of the weight ratio (wt %) of each subordinate component relative to the aforesaid main component composition are within the ranges of 0.1 (wt %)$\leq$a$\leq$12.0 (wt %)

0.1 (wt %)$\leq$b$\leq$12.0 (wt %)

0.1 (wt %)$\leq$c$\leq$9.0 (wt %)

0.2 (wt %)$\leq$d$\leq$5.0 (wt %)

More specifically, it is required that the proportion of the zinc oxide contained relative to the main component composition is 0.1 (wt %)$\leq$a$\leq$12.0 (wt %), as calculated on ZnO basis. Preferably, 0.5 (wt %)$\leq$a$\leq$9.0 (wt %), and more preferably, 1.0 (wt %)$\leq$a$\leq$7.0 (wt %).

As the proportion of the zinc oxide contained relative to the main component composition does not reach 0.1 (wt %) as calculated on ZnO basis, the dielectric porcelain composition tends to have a slender effect on low-temperature sintering. As the proportion of the zinc oxide contained relative to the main component composition exceeds 12.0 (wt %) as calculated on ZnO basis, on the other hand, there are dielectric losses tending to grow large and the Q·f value tending to go down.

It is required that the proportion of the boron oxide contained relative to the main component composition be 0.1 (wt %)$\leq$b$\leq$12.0 (wt %), as calculated on $B_2O_3$ basis. Preferably, 0.5 (wt %)$\leq$b$\leq$9.0 (wt %), and more preferably, 1.0 (wt %)$\leq$b$\leq$7.0 (wt %).

As the proportion of the boron oxide contained relative to the main component composition does not reach 0.1 (wt %) as calculated on $B_2O_3$ basis, the dielectric porcelain composition tends to have a tenuous effect on low-temperature sintering. As the proportion of the boron oxide contained relative to the main component composition exceeds 12.0 (wt %) as calculated on $B_2O_3$ basis, on the other hand, there are dielectric losses tending to grow large and the Q·f value tending to go down.

It is required that the proportion of the copper oxide contained relative to the main component composition be 0.1 (wt %)$\leq$c$\leq$9.0 (wt %), as calculated on CuO basis. Preferably, 0.5 (wt %)$\leq$c$\leq$6.0 (wt %), and more preferably, 1.0 (wt %)$\leq$c$\leq$4.0 (wt %).

As the proportion of the copper oxide contained relative to the main component composition does not reach 0.1 (wt %) as calculated on CuO basis, the dielectric porcelain composition tends to have a slender effect on low-temperature sintering.

As the proportion of the copper oxide contained relative to the main component composition exceeds 9.0 (wt %) as calculated on CuO basis, on the other hand, there are dielectric losses tending to grow large and the Q·f value tending to go down.

In the present invention, there is the alkaline earth metal oxide added to the main component composition in addition to the aforesaid subordinate components so as to achieve further improvements in the low-temperature sintering capability of the dielectric porcelain composition (that enables sintering at a lower temperature). It is thus required that the proportion of the alkaline earth metal oxide added to the main component composition be 0.2 (wt %)$\leq d \leq$5.0 (wt %), as calculated on RO basis where R is an alkaline earth metal. Preferably, 0.5 (wt %)$\leq d \leq$3.5 (wt %), and more preferably, 1.0 (wt %)$\leq d \leq$3.0 (wt %).

A suitable example of the alkaline earth metal R is Ba, Sr, and Ca which may be used in admixture of two or more.

As the proportion of the alkaline earth metal oxide contained relative to the main component composition does not reach 0.2 (wt %) as calculated on the RO basis where R is an alkaline earth metal, there would be no effect on further improvements in low-temperature sintering capability. As the proportion of the alkaline earth metal oxide contained relative to the main component composition exceeds 5.0 (wt %) as calculated on RO basis, on the other hand, there are dielectric losses tending to grow large and the Q·f value tending to go down, although some effects on improvements in low-temperature sintering capability may be expectable.

It is here noted that when Ba is used as the alkaline earth metal R, the proportion of Ba contained relative to the main component composition is preferably in the range of 0.5 (wt %)$\leq d \leq$3.5 (wt %) as calculated on BaO basis; when Sr is used as the alkaline earth metal oxide R, the proportion of Sr contained relative to the main component composition is preferably in the range of 0.4 (wt %)$\leq d \leq$2.5 (wt %) as calculated on SrO basis; and when Ca is used as the alkaline earth metal oxide R, the proportion of Ca contained relative to the main component composition is preferably in the range of 0.2 (wt %)$\leq d \leq$1.5 (wt %) as calculated on CaO basis.

The dielectric porcelain composition of the present invention contains BaO, $Nd_2O_3$, $TiO_2$, MgO and $SiO_2$ as the main components, and ZnO, $B_2O_3$, CuO and RO where R is an alkaline earth metal oxide as the subordinate components. Especially if MgO and $SiO_2$ (forsterite crystal in particular) are contained as the main components, then its specific dielectric constant can be lower than the general specific dielectric constant of BaO-rare earth oxide-$TiO_2$ base dielectric porcelain compositions.

Especially if RO where R is an alkaline earth metal oxide is used as one subordinate component, it makes sure co-firing with a conductor formed of Ag, an alloy containing Ag as a main ingredient or the like, bringing on a lot more improvements in low-temperature sintering capability.

The material of the dielectric porcelain composition according to the present invention is similar to that of the BaO-rare earth oxide-$TiO_2$ base dielectric porcelain composition, and so its shrinkage behavior and linear expansion coefficient at the time of firing are equivalent to those of the BaO-rare earth oxide-$TiO_2$ base dielectric porcelain composition. In other words, even when the dielectric porcelain composition of the present invention is joined to and fired with the BaO-rare earth oxide-$TiO_2$ base dielectric porcelain composition into a multilayer type device, defects are less likely to occur at the interface. Thus, the dielectric porcelain composition of the present invention can be joined to the BaO-rare earth oxide-$TiO_2$ base dielectric porcelain composition to fabricate a multilayer type device of high performance.

Note here that the dielectric porcelain composition according to the present invention may contain other compounds and elements within such a range that the objects and advantages of the present invention are achievable. The incorporation of the manganese oxide in particular in the main component composition ensures that dielectric losses can be minimized.

To provide a less expensive yet smaller device, the dielectric porcelain composition according to the present invention must have as an internal conductor a conductor formed of less expensive Ag, an alloy containing Ag as a main component or the like. Hence, the dielectric porcelain composition must have low-temperature sintering capability enough to enable firing to be carried out at a temperature lower than that melting point of the conductor used as the internal conductor. Because the dielectric characteristics of the dielectric porcelain composition are affected by firing temperatures, too, the firing temperature must be 800° C. to 950° C., and preferably 850° C. to 900° C.

An account of the dielectric loss of a dielectric porcelain composition that is an important consideration in the present invention is now given.

As an alternate current is applied to an ideal dielectric material, an electric current and a voltage have a phase difference of 90°. As the frequency of the alternate current grows high to a point where there is a high frequency, however, the polarization of the dielectric material or the orientation of polar molecules can never respond to changes in a high-frequency electric field, or an electric flux density has a phase delay with respect to an electric field due to the conduction of electrons or ions with the result that the electric current and the voltage come to have a phase other than 90°. The dielectric loss is a phenomenon in which a part of the energy of the aforesaid high frequency dissipates off in the form of heat. The magnitude of dielectric loss is represented by a reciprocal Q (Q=1/tanδ) of the tangent tanδ of a loss angle δ that is a difference between the phase difference of a real current and voltage and the 90° phase difference of an ideal current and voltage. For the estimation of dielectric loss of the dielectric porcelain composition according to the present invention, the value of Q·f that is the product of the aforesaid Q and resonance frequency is used. The smaller the dielectric loss, the larger the value of Q·f grows, and the larger the dielectric loss, the smaller the value of Q·f becomes. The dielectric loss is tantamount to the power loss of a high-frequency device, and so there is a demand for a dielectric porcelain composition having a greater Q·f value. In addition, a multilayer type device must have limited power losses so as to have higher performance; that is, the Q·f value must be at least 4,000 GHz, and preferably 4,5000 GHz or greater.

One of the objects of the present invention is to make it possible to form a multilayer type device by joining the dielectric porcelain composition of the present invention to a BaO-rare earth oxide-$TiO_2$ base dielectric porcelain composition having a high specific dielectric constant. In other words, one technical challenge of the present invention is to provide a dielectric porcelain composition having a specific dielectric constant lower than that of that BaO-rare earth oxide-$TiO_2$ base dielectric porcelain composition. Some BaO-rare earth oxide-$TiO_2$ base dielectric porcelain compositions have been reported to have a specific dielectric constant of 50 to 105; however, the dielectric porcelain composition of the present invention is required to have a specific dielectric constant ∈r of up to 50. For a multilayer type device of higher performance, the dielectric constant ∈r should be preferably up to 40, and more preferably up to 30, and even more preferably 20 to 30.

An account of the temperature coefficient tf (ppm/K) of resonance frequency of a dielectric porcelain composition that is another important consideration in the present invention is now given.

The temperature coefficient tf (ppm/K) of resonance frequency of a dielectric porcelain composition is worked out from the following equation (1).

$$\tau f = [f_T - f_{ref}/f_{ref}(T - T_{ref})] \times 1{,}000{,}000 \text{ (ppm/K)} \quad (1)$$

Here $f_T$ is indicative of a resonance frequency (kHz) at a temperature T, and $f_{ref}$ is indicative of a resonance frequency (kHz) at a reference temperature $T_{ref}$.

The magnitude of the absolute value of the temperature coefficient τf of resonance frequency means the magnitude of the quantity of change in the resonance frequency of a dielectric porcelain composition relative to temperature changes. For high-frequency devices like capacitors and dielectric filters, it is required to diminish resonance frequency changes with temperatures, and for the dielectric porcelain composition of the present invention, too, it is required to diminish the absolute value of the temperature coefficient τf of resonance frequency.

When the dielectric porcelain composition of the present invention is used for a dielectric resonator, the temperature coefficient τf of resonance frequency must be in the range of −40 (ppm/K) to +40 (ppm/K) so as to obtain further reductions in resonance frequency changes with temperatures. Further, for multilayer type devices of higher performance, the temperature coefficient τf must be in the range of −25 (ppm/K) to +25 (ppm/K), and preferably −10 (ppm/K) to +10 (ppm/K).

The estimation of low-temperature firing capability of a dielectric porcelain composition may be made by firing the starting components at a gradually decreasing temperature to find out whether sintering proceeds to a level at which the desired dielectric characteristics are measurable. The estimation of dielectric characteristics of a dielectric porcelain composition may be made by taking measurements of dielectric loss, resonance frequency changes with temperature changes (the temperature coefficient of resonance frequency) and specific dielectric constant pursuant to JIS R 1627 1996 (Testing Method for the Dielectric Characteristics of Fine Ceramics in Microwave Applications).

Explanation of Dielectric Porcelain Composition Production Process

Next, the production process for the dielectric porcelain composition of the present invention is explained.

In the production process for the dielectric porcelain composition of the present invention, the barium-containing raw material, the neodymium-containing raw material, the titanium-containing raw material, the magnesium-containing raw material, the silicon-containing raw material, the zinc-containing raw material, the boron-containing raw material, the copper-containing raw material and the alkaline earth metal-containing raw material are fired together into a BaO—Nd$_2$O$_3$—TiO$_2$—MgO—SiO$_2$—ZnO—B$_2$O$_3$—CuO—RO (R is an alkaline earth metal) base dielectric porcelain composition, wherein forsterite (2MgO.SiO$_2$) powders are used as the magnesium-containing raw material and the silicon-containing raw material.

For production raw materials for the dielectric porcelain composition of the present invention, oxides and/or compounds that turn into oxides upon firing are used. Examples of the compounds that turn into oxides upon firing are carbonates, nitrates, oxalates, hydroxides, sulfides, and organic metal compounds.

Figure 3:
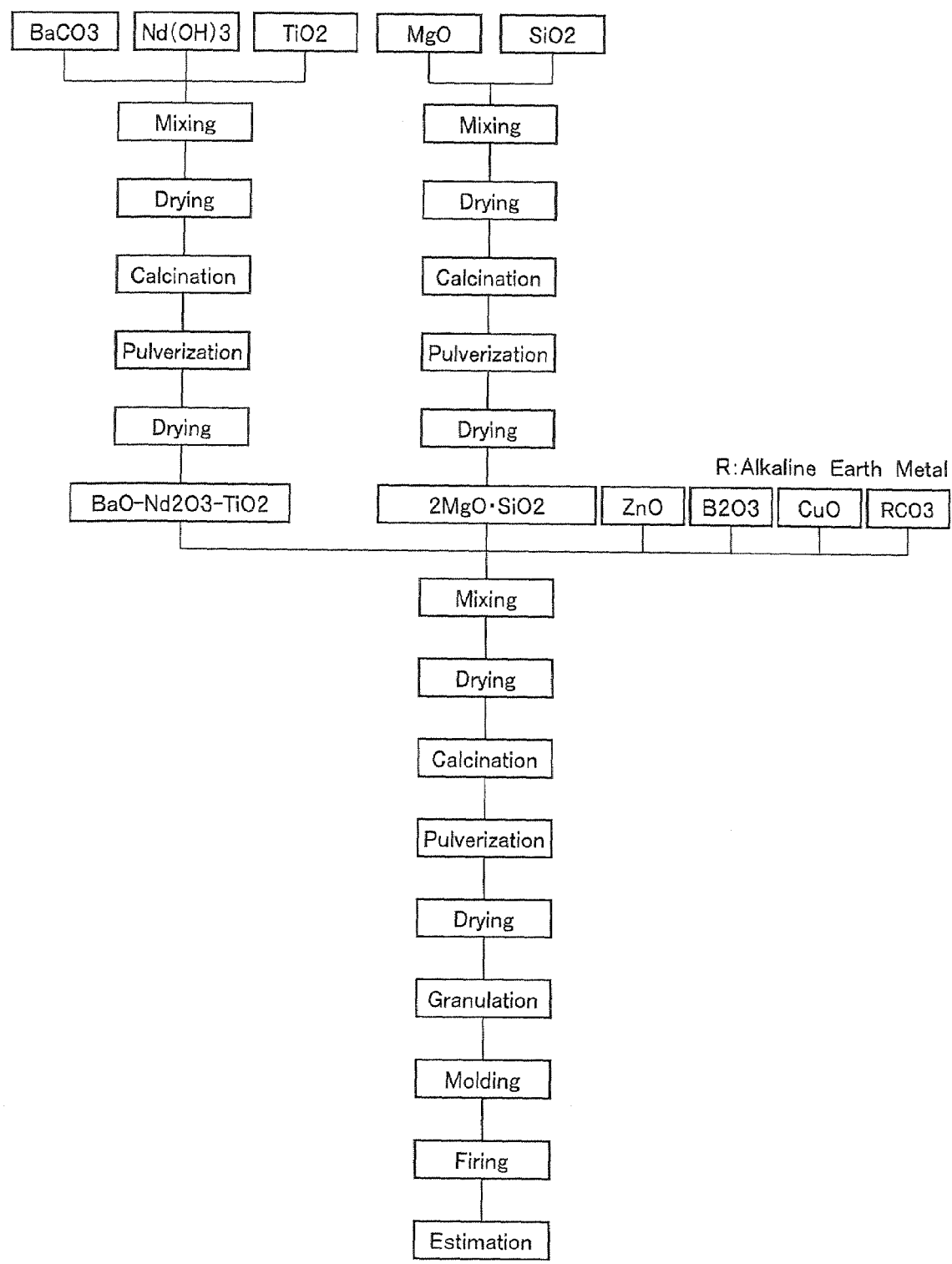
FIG. 3 is illustrative of the process steps for producing the dielectric porcelain composition of the invention according to the third group of this application.

FIG. 3 is illustrative of one embodiment of the dielectric porcelain composition production process according to the present invention.

The dielectric porcelain composition production process according to the present invention is now explained in more details with reference to FIG. 3.

First of all, for instance, barium carbonate, neodymium hydroxide and titanium oxide that are a part of the main component composition are provided at the ready. Then, they are weighed and mixed together in given amounts, and calcined.

Mixing here is carried out such that the molar ratios x, y and z in the composition formula xBaO.yNd$_2$O$_3$.zTiO$_2$ satisfy the above composition relations.

Barium carbonate, neodymium oxide and titanium oxide may be mixed either dry or wet. For instance, they may be mixed by means of a ball mill in a mixing mode using purified water or a solvent such as ethanol. The mixing time may be about 4 hours to about 24 hours.

Thereafter, the mixed raw material is dried at 100° C. to 200° C., preferably 120° C. to 140° C. for about 12 hours to about 36 hours, followed by calcination.

Calcination is a step for the synthesis of a BaO—Nd$_2$O$_3$—TiO$_2$ base compound from a mixture material comprising barium carbonate, neodymium hydroxide and titanium oxide. That step is preferably carried out at a calcination temperature of 1,100° C. to 1,500° C., especially 1,100° C. to 1,350° C. for about 1 hour to about 24 hours.

The synthesized BaO—Nd$_2$O$_3$—TiO$_2$ base compound is pulverized into powders, and dried. Pulverization may be carried out either dry or wet, for instance, by means of a ball mill in a pulverization mode using purified water or a solvent such as ethanol. The pulverization time may be about 4 hours to about 24 hours.

The powders obtained by pulverization may be dried at a drying temperature of 100° C. to 200° C., preferably 120° C. to 140° C. for about 12 hours to about 36 hours. Thus, BaO—Nd$_2$O$_3$—TiO$_2$ base compound powders may be obtained.

Then, magnesium oxide and silicon oxide that are another part of the main component material are at the ready. Then, they are weighed and mixed together in given amounts, and calcined. Magnesium oxide and silicon oxide may be mixed either dry or wet. For instance, they may be mixed by means of a ball mill in a mixing mode using purified water or a solvent such as ethanol. The mixing time may be about 4 hours to about 24 hours.

Thereafter, the mixed raw material is dried at 100° C. to 200° C., preferably 120° C. to 140° C. for about 12 hours to about 36 hours, followed by calcination.

Calcination is a step for the synthesis of forsterite crystal from a mixture material comprising magnesium oxide and silicon oxide. That step is preferably carried out at a calcination temperature of 1,100° C. to 1,500° C., especially 1,100° C. to 1,350° C. for about 1 hour to about 24 hours.

The incorporation as the main components of the BaO—Nd$_2$O$_3$—TiO$_2$ base compound and the forsterite crystal ensures that, by the effect of the forsterite crystal, the specific dielectric constant ∈r of the dielectric porcelain composition is let go down, and the temperature coefficient of resonance frequency is brought to near zero, ending up with reduced dielectric losses. To enhance the effect of forsterite added, it is required to reduce a portion of the aforesaid raw material that does not turn into forsterite and remains unreacted; it is desired that the aforesaid raw material mixing be carried out such that the number of moles of magnesium is twice as many as that of silicon.

The synthesized forsterite is pulverized into powders, and dried. Pulverization may be carried out either dry or wet, for instance, by means of a ball mill in a pulverization mode using purified water or a solvent such as ethanol. The pulverization time may be about 4 hours to about 24 hours.

The powders obtained by pulverization may be dried at a drying temperature of 100° C. to 200° C., preferably 120° C. to 140° C. for about 12 hours to about 36 hours. Thus, forsterite powders may be obtained.

Instead of obtaining forsterite powders by the synthesis and pulverization of forsterite from the magnesium-containing raw material and the silicon-containing raw material as shown in FIG. 3, it is acceptable to use commercially available forsterite. That is, a commercial forsterite product may be pulverized by means of a ball mill in a pulverization mode using purified water or a solvent such as ethanol, and then dried at 100° C. to 200° C., preferably 120° C. to 140° C. for about 12 hours to about 36 hours into forsterite powders.

Next, the $BaO$—$Nd_2O_3$—$TiO_2$ base compound powders, the forsterite powders, and zinc oxide, boron oxide, copper oxide and alkaline earth metal carbonate that are weighed in such a given range as to satisfy the aforesaid subordinate component composition are mixed together into a raw mixture powder material.

Mixing may be carried out either dry or wet, for instance, by means of a ball mill in a mixing mode using purified water or a solvent such as ethanol. The mixing time may be about 4 hours to about 24 hours.

After the completion of mixing, the raw mixture powder material was dried at 100° C. to 200° C., preferably 120° C. to 140° C. for about 12 hours to about 36 hours.

Next, the raw mixture powder material is again calcined at a temperature lower than the firing temperature, for instance, 700° C. to 800° C. for about 1 to about 10 hours. With that calcination carried out at a lower temperature, forsterite does not melt so that a crystal form of forsterite can be incorporated in the dielectric porcelain composition. Thereafter, the calcined raw mixture powder material is pulverized and dried. Pulverization is carried out either dry or wet, for instance, by means of a ball mill in a pulverization mode using purified water or a solvent such as ethanol. The pulverization time may be about 4 hours to about 24 hours. The powders obtained by pulverization may be dried at a drying temperature of 100° C. to 200° C., preferably 120° C. to 140° C. for about 12 hours to about 36 hours. Thus, by carrying out the second calcination and pulverization, the main and subordinate components can be placed in a uniform state so that the dielectric porcelain composition here can be obtained in a uniform state at later production steps.

After mixing the powders obtained as described above with an organic binder based on, for instance, polyvinyl alcohol, acryl, and ethyl cellulose, the mixture is molded in a desired shape, followed by sintering by firing of the molded product. Molding may be carried out either in a wet mode such as a sheet process or printing, or in a dry mode such as press molding; appropriate selection may be from molding processes depending on the desired shape. Firing is preferably carried out in an oxygen atmosphere such as air, and the firing temperature must be lower than the melting point of Ag, an alloy containing Ag as a main component or the like, which forms a conductor that is used as an internal electrode, for instance, at 800° C. to 950° C., preferably 850° C. to 900° C.

A multilayer type device is fabricated of a multilayer ceramic substrate comprising a plurality of ceramic layers, each with a built-in dielectric device such as a capacitor or inductor. The multilayer ceramic substrate is fabricated by stacking and co-firing a plurality of green sheets of ceramic material having different dielectric characteristics while conductors as internal conductors are located at interfaces optionally with through-holes. By stacking a green sheet molded of the dielectric porcelain composition of the present invention on a green sheet molded of a general BaO-rare earth oxide-$TiO_2$ base dielectric porcelain composition known in the art, it is possible to fabricate a multilayer ceramic substrate using the dielectric porcelain composition of the present invention.

The present invention is now explained in more details with reference to specific examples.

EXPERIMENTAL EXAMPLE 3-1

Sample Preparation and How to Measure the Desired Physical Properties

Such various dielectric porcelain composition samples as set out in Table 3 were prepared in the following manners. The definitions of $\alpha$, $\beta$, x, y and z that specify the main component composition, a, b, c and d that specify the amounts of the subordinate components added, and R have been mentioned.

A basic production process is now explained specifically with reference to Sample No. 3-8 that is an inventive sample.

First, the starting materials for the main components $BaCO_3$, $Nd(OH)_3$ and $TiO_2$ were weighed such that x, y and z, i.e., the molar ratios of BaO, $Nd_2O_3$ and $TiO_2$ in the BaO—$Nd_2O_3$—$TiO_2$ base compound after calcination had such values as set out in the main component composition column of Sample No. 3-8 in Table 3, given later. That is, the starting materials were weighed such that x=18.5 (mol %), y=15.4 (mol %) and z=66.1 (mol %).

Purified water was added to the weighed starting materials at a slurry concentration of 25%, which were in turn wet mixed in a ball mill for 16 hours, followed by drying at 120° C. for 24 hours. The dried powders were calcined in air (1,200° C., 4 hours). Purified water was added to the BaO—$Nd_2O_3$—$TiO_2$ base compound after calcination at a slurry concentration of 25%, which was then pulverized in a ball mill for 16 hours, and thereafter dried at 120° C. for 24 hours to prepare BaO—$Nd_2O_3$—$TiO_2$ base compound powders.

Then, the remaining starting materials for the main components, that is, MgO and $SiO_2$ were weighed such that the number of moles of magnesium was twice as large as that of silicon. Purified water was added to them at a slurry concentration of 25%, which were wet mixed in a ball mill for 16 hours, followed by drying at 120° C. for 24 hours.

The dried powders were calcined in air (1,200° C., 3 hours). Purified water was added to the forsterite after calcination at a slurry concentration of 25%, which was in turn pulverized in a ball mill for 16 hours, and thereafter dried at 120° C. for 24 hours to prepare forsterite powders.

Next, ZnO, $B_2O_3$, CuO and $BaCO_3$ that were the raw materials for the subordinate components were at the ready.

Then, the pulverized BaO—$Nd_2O_3$—$TiO_2$ base compound powders and the pulverized forsterite powders were blended together at such mixing ratios as set out in Table 3, given later, and the subordinate components were blended with those main components at such blending ratios as set out at the amount-of-subordinate-component-added column of Sample No. 3-8 in Table 3 to obtain raw mixture powders. Specifically, weighing was done such that $\alpha$=55 (vol %), $\beta$=45 (vol %), a=6.0 (wt %), b=4.5 (wt %), c=3.0 (wt %) and d=0.69 (wt %), purified water was added at a slurry concentration of 25%, a 16-hour wet mixing was carried out in a ball mill, and drying was performed at 120° C. for 24 hours to obtain the raw mixture powders.

The thus obtained raw mixture powders were again calcined in air (750° C., 2 hours) to obtain calcined powders.

Purified water was added to the resultant calcined powders in such a way as to provide a slurry concentration of 25%, which were again wet pulverized in a ball mill for 16 hours, and thereafter dried at 120° C. for 24 hours. An aqueous solution of polyvinyl alcohol was added as a binder to the re-pulverized powders for granulation, and the resulting granules were molded into a columnar shape of 12 mm in diameter and 6 mm in height. The molded column was fired at the temperature indicated at the firing temperature column of Sample No. 3-8 in Table 3, viz., 870° C. for 1 hour to obtain a dielectric porcelain composition.

The thus obtained dielectric porcelain composition was trimmed off at its surface to prepare a columnar pellet of 10 mm in diameter and 5 mm in height in the form of measuring Sample No. 3-8.

Dielectric porcelain composition Sample No. 3-8 was measured for a specific dielectric constant $\epsilon r$, a Q·f value and a temperature coefficient $\tau f$ of resonance frequency pursuant to JIS R 1627 1996 (Testing Method for the Dielectric Characteristics of Fine Ceramics in Microwave Applications). Measurements were carried out at a frequency of 8.2 GHz, and resonance frequency was measured at a temperature ranging from −40° C. to 85° C. to work out the temperature coefficient $\tau f$ of resonance frequency from the aforesaid calculation equation (1).

From the fact that each physical property could be measured as indicated in Table 3, Sample No. 3-8 is found to have been fully sintered at the low temperature of 870° C. Note here that each sample is found to have such physical properties as indicated by a specific dielectric constant of $\epsilon r=25.2$, a Q·f value of 4,957 (GHz) and a temperature coefficient of resonance frequency of $\tau f=-2$ (ppm/K).

Following the preparation process of such Sample No. 3-8, various such samples as set out in Table 3 were prepared. At varied firing temperatures (850° C.-910° C.), to what degree a group of samples in a certain range could be sintered at low temperatures was found out (the samples with "unmeasurable" in Table 3 show that they are not sintered to a level at which dielectric characteristics can be measured). Samples that could be sintered were measured for the specific dielectric constant $\epsilon r$, the Q·f value (measured at a measuring frequency range of 7.6 to 8.2 GHz) and the temperature coefficient $\tau f$ of resonance frequency.

The results are summed up in Table 3, given below. Note here that the asterisked (*) samples stand for "reference examples", not "comparative examples". The "reference examples" are equivalent to the invention according to the first group accomplished by the inventors of this application.

It is also noted that the double-asterisked (**) samples are "comparative examples".

TABLE 3-1

| Sample | Main Component Composition | | | | | Amounts of Subordinate Components Added | | | |
|---|---|---|---|---|---|---|---|---|---|
| No. | α | β | x | y | z | a | b | c | d (R) |
| *3-1 | 55 | 45 | 18.5 | 15.4 | 66.1 | 6.0 | 4.5 | 3.0 | — |
| *3-2 | 55 | 45 | 18.5 | 15.4 | 66.1 | 6.0 | 4.5 | 3.0 | — |
| *3-3 | 55 | 45 | 18.5 | 15.4 | 66.1 | 6.0 | 4.5 | 3.0 | — |
| *3-4 | 55 | 45 | 18.5 | 15.4 | 66.1 | 6.0 | 4.5 | 3.0 | — |
| *3-5 | 55 | 45 | 18.5 | 15.4 | 66.1 | 6.0 | 4.5 | 3.0 | — |
| 3-6 | 55 | 45 | 18.5 | 15.4 | 66.1 | 6.0 | 4.5 | 3.0 | 0.69(Ba) |
| 3-7 | 55 | 45 | 18.5 | 15.4 | 66.1 | 6.0 | 4.5 | 3.0 | 0.69(Ba) |
| 3-8 | 55 | 45 | 18.5 | 15.4 | 66.1 | 6.0 | 4.5 | 3.0 | 0.69(Ba) |
| 3-9 | 55 | 45 | 18.5 | 15.4 | 66.1 | 6.0 | 4.5 | 3.0 | 0.69(Ba) |
| 3-10 | 55 | 45 | 18.5 | 15.4 | 66.1 | 6.0 | 4.5 | 3.0 | 0.69(Ba) |
| 3-11 | 55 | 45 | 18.5 | 15.4 | 66.1 | 6.0 | 4.5 | 3.0 | 1.72(Ba) |
| 3-12 | 55 | 45 | 18.5 | 15.4 | 66.1 | 6.0 | 4.5 | 3.0 | 1.72(Ba) |
| 3-13 | 55 | 45 | 18.5 | 15.4 | 66.1 | 6.0 | 4.5 | 3.0 | 1.72(Ba |
| 3-14 | 55 | 45 | 18.5 | 15.4 | 66.1 | 6.0 | 4.5 | 3.0 | 1.72(Ba) |
| 3-15 | 55 | 45 | 18.5 | 15.4 | 66.1 | 6.0 | 4.5 | 3.0 | 1.72(Ba) |
| 3-16 | 55 | 45 | 18.5 | 15.4 | 66.1 | 6.0 | 4.5 | 3.0 | 3.44(Ba) |
| 3-17 | 55 | 45 | 18.5 | 15.4 | 66.1 | 6.0 | 4.5 | 3.0 | 3.44(Ba) |
| 3-18 | 55 | 45 | 18.5 | 15.4 | 66.1 | 6.0 | 4.5 | 3.0 | 3.44(Ba) |
| 3-19 | 55 | 45 | 18.5 | 15.4 | 66.1 | 6.0 | 4.5 | 3.0 | 3.44(Ba) |
| 3-20 | 55 | 45 | 18.5 | 15.4 | 66.1 | 6.0 | 4.5 | 3.0 | 3.44(Ba) |
| **3-21 | 55 | 45 | 18.5 | 15.4 | 66.1 | 6.0 | 4.5 | 3.0 | 5.16(Ba) |
| **3-22 | 55 | 45 | 18.5 | 15.4 | 66.1 | 6.0 | 4.5 | 3.0 | 5.16(Ba) |

| Sample No. | Firing Temp. (° C.) | Dielectric characteristics | | |
|---|---|---|---|---|
| | | εr | Q·f (GHz) | τf (ppm/k) |
| *3-1 | 850 | unmeasurable | | |
| *3-2 | 870 | unmeasurable | | |
| *3-3 | 880 | 25.4 | 5,044 | 2 |
| *3-4 | 890 | 25.9 | 4,988 | 1 |
| *3-5 | 910 | 26.9 | 4,982 | 0 |
| 3-6 | 850 | unmeasurable | | |
| 3-7 | 860 | unmeasurable | | |
| 3-8 | 870 | 25.2 | 4,957 | −2 |
| 3-9 | 890 | 27.0 | 4,901 | −2 |
| 3-10 | 910 | 27.7 | 4,843 | −3 |
| 3-11 | 850 | unmeasurable | | |
| 3-12 | 860 | 25.9 | 4,551 | −4 |
| 3-13 | 870 | 27.2 | 4,847 | −5 |
| 3-14 | 890 | 28.0 | 4,794 | −5 |
| 3-15 | 910 | 28.3 | 4,708 | −5 |
| 3-16 | 850 | 27.9 | 4,398 | −6 |
| 3-17 | 860 | 28.2 | 4,528 | −6 |
| 3-18 | 870 | 28.3 | 4,485 | −7 |
| 3-19 | 890 | 28.4 | 4,467 | −7 |
| 3-20 | 910 | 28.5 | 4,422 | −8 |
| **3-21 | 850 | 28.6 | 3,776 | −11 |
| **3-22 | 860 | 28.7 | 3,774 | −11 |

| Sample | Main Component Composition | | | | | Amounts of Subordinate Components Added | | | |
|---|---|---|---|---|---|---|---|---|---|
| No. | α | β | x | y | z | a | b | c | d (R) |
| 3-23 | 55 | 45 | 18.5 | 15.4 | 66.1 | 6.0 | 4.5 | 3.0 | 0.47(Sr) |
| 3-24 | 55 | 45 | 18.5 | 15.4 | 66.1 | 6.0 | 4.5 | 3.0 | 0.47(Sr) |
| 3-25 | 55 | 45 | 18.5 | 15.4 | 66.1 | 6.0 | 4.5 | 3.0 | 0.45(Sr) |
| 3-26 | 55 | 45 | 18.5 | 15.4 | 66.1 | 6.0 | 4.5 | 3.0 | 0.47(Sr) |
| 3-27 | 55 | 45 | 18.5 | 15.4 | 66.1 | 6.0 | 4.5 | 3.0 | 0.47(Sr) |
| 3-28 | 55 | 45 | 18.5 | 15.4 | 66.1 | 6.0 | 4.5 | 3.0 | 1.16(Sr) |
| 3-29 | 55 | 45 | 18.5 | 15.4 | 66.1 | 6.0 | 4.5 | 3.0 | 1.16(Sr) |
| 3-30 | 55 | 45 | 18.5 | 15.4 | 66.1 | 6.0 | 4.5 | 3.0 | 1.16(Sr) |
| 3-31 | 55 | 45 | 18.5 | 15.4 | 66.1 | 6.0 | 4.5 | 3.0 | 1.16(Sr) |
| 3-32 | 55 | 45 | 18.5 | 15.4 | 66.1 | 6.0 | 4.5 | 3.0 | 1.16(Sr) |
| 3-33 | 55 | 45 | 18.5 | 15.4 | 66.1 | 6.0 | 4.5 | 3.0 | 2.33(Sr) |
| 3-34 | 55 | 45 | 18.5 | 15.4 | 66.1 | 6.0 | 4.5 | 3.0 | 2.33(Sr) |
| 3-35 | 55 | 45 | 18.5 | 15.4 | 66.1 | 6.0 | 4.5 | 3.0 | 2.33(Sr |
| 3-36 | 55 | 45 | 18.5 | 15.4 | 66.1 | 6.0 | 4.5 | 3.0 | 2.33(Sr) |
| 3-37 | 55 | 45 | 18.5 | 15.4 | 66.1 | 6.0 | 4.5 | 3.0 | 2.33(Sr) |
| 3-38 | 55 | 45 | 18.5 | 15.4 | 66.1 | 6.0 | 4.5 | 3.0 | 0.25(Ca) |
| 3-39 | 55 | 45 | 18.5 | 15.4 | 66.1 | 6.0 | 4.5 | 3.0 | 0.25(Ca) |

TABLE 3-1-continued

| | | | | | | | | |
|---|---|---|---|---|---|---|---|---|
| 3-40 | 55 | 45 | 18.5 | 15.4 | 66.1 | 6.0 | 4.5 | 3.0 0.25(Ca) |
| 3-41 | 55 | 45 | 18.5 | 15.4 | 66.1 | 6.0 | 4.5 | 3.0 0.25(Ca) |
| 3-42 | 55 | 45 | 18.5 | 15.4 | 66.1 | 6.0 | 4.5 | 3.0 0.25(Ca) |

| | Firing | Dielectric characteristics | | |
|---|---|---|---|---|
| Sample No. | Temp. (° C.) | ϵr | Q · f (GHz) | τf (ppm/k) |
| 3-23 | 850 | | unmeasurable | |
| 3-24 | 860 | | unmeasurable | |
| 3-25 | 870 | 25.5 | 4,812 | 2 |
| 3-26 | 890 | 27.3 | 4,877 | 2 |
| 3-27 | 910 | 27.8 | 4,820 | 2 |
| 3-28 | 850 | | unmeasurable | |
| 3-29 | 860 | 27.0 | 4,628 | 6 |
| 3-30 | 870 | 28.1 | 4,773 | 5 |
| 3-31 | 890 | 28.6 | 4,711 | 5 |
| 3-32 | 910 | 28.9 | 4,650 | 5 |
| 3-33 | 850 | 28.5 | 4,199 | 9 |
| 3-34 | 860 | 29.0 | 4,393 | 9 |
| 3-35 | 870 | 29.2 | 4,423 | 8 |
| 3-36 | 890 | 29.3 | 4,376 | 8 |
| 3-37 | 910 | 29.4 | 4,389 | 8 |
| 3-38 | 850 | | unmeasurable | |
| 3-39 | 860 | | unmeasurable | |
| 3-40 | 870 | 26.6 | 4,800 | 1 |
| 3-41 | 890 | 28.3 | 4,834 | 1 |
| 3-42 | 910 | 28.8 | 4,795 | 1 |

| Sample | Main Component Composition | | | | | Amounts of Subordinate Components Added | | | |
|---|---|---|---|---|---|---|---|---|---|
| No. | α | β | x | y | z | a | b | c | d (R) |
| 3-43 | 55 | 45 | 18.5 | 15.4 | 66.1 | 6.0 | 4.5 | 3.0 | 0.63(Ca) |
| 3-44 | 55 | 45 | 18.5 | 15.4 | 66.1 | 6.0 | 4.5 | 3.0 | 0.63(Ca) |
| 3-45 | 55 | 45 | 18.5 | 15.4 | 66.1 | 6.0 | 4.5 | 3.0 | 0.63(Ca) |
| 3-46 | 55 | 45 | 18.5 | 15.4 | 66.1 | 6.0 | 4.5 | 3.0 | 0.63(Ca) |
| 3-47 | 55 | 45 | 18.5 | 15.4 | 66.1 | 6.0 | 4.5 | 3.0 | 0.63(Ca) |
| 3-48 | 55 | 45 | 18.5 | 15.4 | 66.1 | 6.0 | 4.5 | 3.0 | 1.26(Ca) |
| 3-49 | 55 | 45 | 18.5 | 15.4 | 66.1 | 6.0 | 4.5 | 3.0 | 1.26(Ca) |
| 3-50 | 55 | 45 | 18.5 | 15.4 | 66.1 | 6.0 | 4.5 | 3.0 | 1.26(Ca) |
| 3-51 | 55 | 45 | 18.5 | 15.4 | 66.1 | 6.0 | 4.5 | 3.0 | 1.26(Ca) |
| 3-52 | 55 | 45 | 18.5 | 15.4 | 66.1 | 6.0 | 4.5 | 3.0 | 1.26(Ca) |

| | Firing | Dielectric characteristics | | |
|---|---|---|---|---|
| Sample No. | Temp. (° C.) | ϵr | Q · f (GHz) | τf (ppm/k) |
| 3-43 | 850 | | unmeasurable | |
| 3-44 | 860 | 28.0 | 4,577 | 4 |
| 3-45 | 870 | 29.2 | 4,698 | 3 |
| 3-46 | 890 | 29.4 | 4,642 | 3 |
| 3-47 | 910 | 29.5 | 4,605 | 3 |
| 3-48 | 850 | 29.0 | 4,123 | 10 |
| 3-49 | 860 | 29.5 | 4,251 | 10 |
| 3-50 | 870 | 29.6 | 4,247 | 9 |
| 3-51 | 890 | 29.7 | 4,258 | 9 |
| 3-52 | 910 | 29.7 | 4,271 | 9 |

**comparative example

The advantages of the present invention would be evident from the results of Table 3. As the firing temperature of 880° C. in Sample No. *3-3 (reference example) is taken as a comparative criterion value, then the incorporation of the given amount of the alkaline earth metal oxide as one subordinate component in the present invention enables the firing temperature to be brought down to 870° C. (Sample No. 3-8), 860° C. (Sample No. 3-12), 850° C. (Sample No. 3-16), 870° C. (Sample No. 3-25), 860° C. (Sample No. 3-29), 850° C. (Sample No. 3-33), 870° C. (Sample No. 3-40), 860° C. (Sample No. 3-44), and 850° C. (Sample No. 3-48).

With Sample No. *3-21 (comparative) and Sample No. *3-22 (comparative), there is a problem that although the firing temperature can somehow be reduced down to 850° C. or 860° C., yet too much alkaline earth metal oxide causes the Q·f value to fall short of 4,000 GHz, resulting in an increased dielectric loss.

EXPERIMENTAL EXAMPLE 3-2

Sample Preparation and How to Measure the Desired Physical Properties

Such various dielectric porcelain composition samples as set out in Table 4 were prepared as in Experimental Example 3-1.

As can be seen from Table 4, while the values of α, β, x, y and z specifying the main component composition and the values of a, b and c indicative of the amounts of the subordinate components added were varied, experiments were carried out to study the influences of such parameters. Note here that Ca was used as the alkaline earth metal R in a constant amount of 0.63 wt %.

The results are summed up in Table 4, given below. Throughout Table 4, the value of the firing temperature (° C.) is 870(° C.), and the samples with ** stand for "comparative examples".

TABLE 4-1

| Sample | Main Component Composition | | | | | Amounts of Subordinate Components Added | | | |
|---|---|---|---|---|---|---|---|---|---|
| No. | α | β | x | y | z | a | b | c | d (R) |
| **3-53 | 5 | 95 | 18.5 | 15.4 | 66.1 | 6.0 | 4.5 | 3.0 | 0.63(Ca) |
| 3-54 | 15 | 85 | 18.5 | 15.4 | 66.1 | 6.0 | 4.5 | 3.0 | 0.63(Ca) |
| 3-55 | 25 | 75 | 18.5 | 15.4 | 66.1 | 6.0 | 4.5 | 3.0 | 0.63(Ca) |
| 3-56 | 35 | 65 | 18.5 | 15.4 | 66.1 | 6.0 | 4.5 | 3.0 | 0.63(Ca) |
| 3-57 | 45 | 55 | 18.5 | 15.4 | 66.1 | 6.0 | 4.5 | 3.0 | 0.63(Ca) |
| 3-58 | 65 | 35 | 18.5 | 15.4 | 66.1 | 6.0 | 4.5 | 3.0 | 0.63(Ca) |
| 3-59 | 75 | 25 | 18.5 | 15.4 | 66.1 | 6.0 | 4.5 | 3.0 | 0.63(Ca) |
| **3-60 | 85 | 15 | 18.5 | 15.4 | 66.1 | 6.0 | 4.5 | 3.0 | 0.63(Ca) |
| **3-61 | 55 | 45 | 6.7 | 26.7 | 66.6 | 6.0 | 4.5 | 3.0 | 0.63(Ca) |
| 3-62 | 55 | 45 | 11.7 | 21.7 | 66.6 | 6.0 | 4.5 | 3.0 | 0.63(Ca) |
| 3-63 | 55 | 45 | 16.7 | 16.7 | 66.6 | 6.0 | 4.5 | 3.0 | 0.63(Ca) |
| **3-64 | 55 | 45 | 23.7 | 12.7 | 63.6 | 6.0 | 4.5 | 3.0 | 0.63(Ca) |
| **3-65 | 55 | 45 | 18.7 | 7.7 | 73.6 | 6.0 | 4.5 | 3.0 | 0.63(Ca |
| 3-66 | 55 | 45 | 16.7 | 15.7 | 67.6 | 6.0 | 4.5 | 3.0 | 0.63(Ca) |
| 3-67 | 55 | 45 | 16.7 | 18.7 | 64.6 | 6.0 | 4.5 | 3.0 | 0.63(Ca) |
| **3-68 | 55 | 45 | 16.7 | 30.7 | 52.6 | 6.0 | 4.5 | 3.0 | 0.63(Ca) |
| **3-69 | 55 | 45 | 16.7 | 26.7 | 56.6 | 6.0 | 4.5 | 3.0 | 0.63(Ca) |
| 3-70 | 55 | 45 | 16.5 | 21.5 | 62.0 | 6.0 | 4.5 | 3.0 | 0.63(Ca) |
| 3-71 | 55 | 45 | 18.7 | 11.7 | 69.6 | 6.0 | 4.5 | 3.0 | 0.63(Ca) |
| **3-72 | 55 | 45 | 11.7 | 11.7 | 76.6 | 6.0 | 4.5 | 3.0 | 0.63(Ca) |

| | Firing | Dielectric characteristics | | |
|---|---|---|---|---|
| Sample No. | Temp. (° C.) | ϵr | Q · f (GHz) | τf (ppm/k) |
| **3-53 | 870 | 9.9 | 7,428 | −41 |
| 3-54 | 870 | 10.9 | 7,159 | −35 |
| 3-55 | 870 | 14.3 | 6,488 | −27 |
| 3-56 | 870 | 18.3 | 5,961 | −18 |
| 3-57 | 870 | 22.5 | 5,408 | −7 |
| 3-58 | 870 | 38.8 | 4,644 | 17 |
| 3-59 | 870 | 49.8 | 4,474 | 35 |
| **3-60 | 870 | 57.6 | 4,316 | 47 |
| **3-61 | 870 | 21.1 | 2,998 | −21 |
| 3-62 | 870 | 23.7 | 4,010 | −35 |
| 3-63 | 870 | 27.9 | 6,082 | −33 |
| **3-64 | 870 | | unmeasurable | |
| **3-65 | 870 | 31.7 | 2,856 | 18 |
| 3-66 | 870 | 28.3 | 6,172 | −9 |
| 3-67 | 870 | 25.4 | 5,342 | −24 |
| **3-68 | 870 | 19.4 | 2,753 | −37 |
| **3-69 | 870 | 19.5 | 2,982 | −35 |

TABLE 4-1-continued

| | | | | | |
|---|---|---|---|---|---|
| 3-70 | 870 | 21.3 | 5,025 | −31 |
| 3-71 | 870 | 27.0 | 6,838 | 5 |
| **3-72 | 870 | | unmeasurable | |

| Sample | Main Component Composition | | | | Amounts of Subordinate Components Added | | | |
|---|---|---|---|---|---|---|---|---|
| No. | α | β | x | y | z | a | b | c | d (R) |
| **3-73 | 55 | 45 | 18.5 | 15.4 | 66.1 | 0.05 | 4.5 | 3.0 | 0.63(Ca) |
| 3-74 | 55 | 45 | 18.5 | 15.4 | 66.1 | 0.5 | 4.5 | 3.0 | 0.63(Ca) |
| 3-75 | 55 | 45 | 18.5 | 15.4 | 66.1 | 3.0 | 4.5 | 3.0 | 0.63(Ca) |
| 3-76 | 55 | 45 | 18.5 | 15.4 | 66.1 | 9.0 | 4.5 | 3.0 | 0.63(Ca) |
| **3-77 | 55 | 45 | 18.5 | 15.4 | 66.1 | 16.0 | 4.5 | 3.0 | 0.63(Ca) |
| **3-78 | 55 | 45 | 18.5 | 15.4 | 66.1 | 6.0 | 0.05 | 3.0 | 0.63(Ca) |
| 3-79 | 55 | 45 | 18.5 | 15.4 | 66.1 | 6.0 | 0.5 | 3.0 | 0.63(Ca) |
| 3-80 | 55 | 45 | 18.5 | 15.4 | 66.1 | 6.0 | 3.0 | 3.0 | 0.63(Ca) |
| 3-81 | 55 | 45 | 18.5 | 15.4 | 66.1 | 6.0 | 9.0 | 3.0 | 0.63(Ca) |
| **3-82 | 55 | 45 | 18.5 | 15.4 | 66.1 | 6.0 | 16.0 | 3.0 | 0.63(Ca) |
| **3-83 | 55 | 45 | 18.5 | 15.4 | 66.1 | 6.0 | 4.5 | 0.05 | 0.63(Ca) |
| 3-84 | 55 | 45 | 18.5 | 15.4 | 66.1 | 6.0 | 4.5 | 0.5 | 0.63(Ca) |
| 3-85 | 55 | 45 | 18.5 | 15.4 | 66.1 | 6.0 | 4.5 | 1.5 | 0.63(Ca |
| 3-86 | 55 | 45 | 18.5 | 15.4 | 66.1 | 6.0 | 4.5 | 6.0 | 0.63(Ca) |
| **3-87 | 55 | 45 | 18.5 | 15.4 | 66.1 | 6.0 | 4.5 | 12.0 | 0.63(Ca) |

| | Firing | Dielectric characteristics | | |
|---|---|---|---|---|
| Sample No. | Temp. (° C.) | εr | Q · f (GHz) | τf (ppm/k) |
| **3-73 | 870 | | unmeasurable | |
| 3-74 | 870 | 27.4 | 4,812 | 8 |
| 3-75 | 870 | 29.3 | 4,887 | 6 |
| 3-76 | 870 | 28.5 | 4,752 | 0 |
| **3-77 | 870 | 27.0 | 3,604 | −6 |
| **3-78 | 870 | | unmeasurable | |
| 3-79 | 870 | 27.3 | 4,597 | 7 |
| 3-80 | 870 | 29.3 | 4,763 | 5 |
| 3-81 | 870 | 24.2 | 4,522 | 1 |
| **3-82 | 870 | 19.5 | 3,370 | −2 |
| **3-83 | 870 | | unmeasurable | |
| 3-84 | 870 | 28.3 | 4,848 | 5 |
| 3-85 | 870 | 29.2 | 5,068 | 3 |
| 3-86 | 870 | 28.2 | 4,671 | −4 |
| **3-87 | 870 | 27.4 | 3,055 | −13 |

**comparative example

The advantages of the present invention would be evident from the results of Tables 3 and 4. That is, the present invention provides a dielectric porcelain composition that contains as main components BaO, $Nd_2O_3$, $TiO_2$, MgO and $SiO_2$ at the given ratios and as subordinate Components ZnO, $B_2O_3$ and CuO at the given ratios, and Further comprises an alkaline earth metal oxide RO (R: an Alkaline earth metal oxide) as an additional subordinate Component. It is thus possible to obtain a dielectric porcelain composition having low-temperature sintering capability stable and reliable enough to permit a conductor formed of Ag, an alloy containing Ag as a main component or the like to be used as an internal conductor.

It is also possible to obtain a dielectric porcelain Composition that has limited resonance frequency changes With temperature changes and a specific dielectric Constant lower than that of a BaO-rare earth oxide-$TiO_2$ Base dielectric porcelain composition, and so is suitable For multilayer type device formation.

POSSIBLE INDUSTRIAL APPLICATIONS

The dielectric porcelain composition of the present Invention could find wide applications in electronic parts industries.

What we claim is:

1. A dielectric porcelain composition, comprising, as a main component composition, a component represented by a composition formula $\{\alpha(xBaO.yNd_2O_3.zTiO_2)+\beta(2MgO.SiO_2)\}$ wherein x, y and z are indicative of a molar ratio of BaO, $Nd_2O_3$, and $TiO_2$, are in ranges of 14 (mol %)≦x≦19 (mol %), 11.7 (mol %)≦y≦17 (mol %), 65 (mol %)≦z≦71 (mol %), and have a relation of x+y+z=100 (mol %); and α and β are indicative of a volume ratio of each component in said main component composition, are in ranges of 25 (vol %)≦α<65 (vol %), 35 (vol %)<β≦75 (vol %), and have a relation of α+β=100 (vol %),
wherein a zinc oxide, a boron oxide and a copper oxide are present as subordinate components relative to said main component composition, and when said subordinate components are represented by aZnO, $bB_2O_3$ and cCuO, a, b and c are indicative of a weight ratio of each subordinate component relative to said main component composition and have relations of 0.05 (wt %)<a≦17.0 (wt %), 0.05 (wt %)<b≦17.0 (wt %), and 0.05 (wt %)<c≦14.0 (wt %).

2. The dielectric porcelain composition according to claim 1, which comprises a forsterite ($2MgO.SiO_2$) crystal.

3. The dielectric porcelain composition according to claim 1, which has a specific dielectric constant of up to 50.

4. A process for producing a dielectric porcelain composition according to claim 1, comprising
firing a barium-containing raw material, a neodymium-containing raw material, a titanium-containing raw material, a magnesium-containing raw material, a silicon-containing raw material, a zinc-containing raw material, a boron-containing raw material and a copper-containing raw material, wherein
forsterite ($2MgO.SiO_2$) powders are used as said magnesium-containing raw material and said silicon-containing raw material.

5. A dielectric porcelain composition, comprising, as a main component composition, a component represented by a composition formula $\{\alpha(xBaO.yNd_2O_3.zTiO_2)+\beta(2MgO.SiO_2)\}$ wherein x, y and z are indicative of a molar ratio of BaO, $Nd_2O_3$, and $TiO_2$, are in ranges of 9 (mol %)≦x≦22 (mol %)

9 (mol %)≦y≦29 (mol %)

61 (mol %)≦z≦74 (mol %), and have a relation of x+y+z=100 (mol %); and α and β are indicative of a volume ratio of each component in said main component composition, are in ranges of 15 (vol %)≦α≦85 (vol %)

25 (vol %)≦β≦85 (vol %), and have a relation of α+β=100 (vol %), wherein
a zinc oxide, a boron oxide, a copper oxide and a manganese oxide are present as subordinate components relative to said main component composition, and when said subordinate components are represented by aZnO, bB$_2$O$_3$, cCuO and dMnO, a, b, c and d are indicative of a weight ratio of each subordinate component relative to said main component composition and have relations of 0.1 (wt %) ≦ a ≦ 12.0 (wt %)

0.1 (wt %) ≦ b ≦ 12.0 (wt %)

0.1 (wt %) ≦ c ≦ 9.0 (wt %), and 0.01 (wt %) ≦ d ≦ 6.5 (wt %).

6. The dielectric porcelain composition according to claim 5, which comprises a forsterite (2MgO·SiO$_2$) crystal.

7. The dielectric porcelain composition according to claim 5, which has a specific dielectric constant of up to 50.

8. A process for producing a dielectric porcelain composition according to claim 5, comprising
firing a barium-containing raw material, a neodymium-containing raw material, a titanium-containing raw material, a magnesium-containing raw material, a silicon-containing raw material, a zinc-containing raw material, a boron-containing raw material, a copper-containing raw material and a manganese-containing raw material, wherein
forsterite (2MgO·SiO$_2$) powders are used as said magnesium-containing raw material and said silicon-containing raw material.

9. The dielectric porcelain composition according to claim 1, which has a Q·f value of about 2000 to about 8000 GHz.

10. The dielectric porcelain composition according to claim 1, wherein said α and β are in ranges of 35 (vol %) ≦ α ≦ 55 (vol %)

45 (vol %) ≦ β ≦ 65 (vol %).

11. The dielectric porcelain composition according to claim 1, wherein said relations of said aZnO, bB$_2$O$_3$, and cCuO are 0.1 (wt %) ≦ a ≦ 12.0 (wt %)

0.1 (wt %) ≦ b ≦ 12.0 (wt %)

0.1 (wt %) ≦ c ≦ 9.0 (wt %).

12. The dielectric porcelain composition according to claim 1, wherein said relations of said aZnO, bB$_2$O$_3$, and cCuO are 0.5 (wt %) ≦ a ≦ 9.0 (wt %)

0.5 (wt %) ≦ b ≦ 9.0 (wt %)

0.5 (wt %) ≦ c ≦ 6.0 (wt %).

13. The dielectric porcelain composition according to claim 1, wherein said relations of said aZnO, bB$_2$O$_3$, and cCuO are 1.0 (wt %) ≦ a ≦ 7.0 (wt %)

1.0 (wt %) ≦ b ≦ 7.0 (wt %)

1.0 (wt %) ≦ c ≦ 4.0 (wt %).

14. The dielectric porcelain composition according to claim 5, which has a Q·f value of about 2000 to about 8000 GHz.

15. The dielectric porcelain composition according to claim 5, wherein said α and β are in ranges of 25 (vol %) ≦ α ≦ 65 (vol %)

35 (vol %) ≦ β ≦ 65 (vol %).

16. The dielectric porcelain composition according to claim 5, wherein said α and β are in ranges of 35 (vol %) ≦ α ≦ 55 (vol %)

45 (vol %) ≦ β ≦ 65 (vol %).

17. The dielectric porcelain composition according to claim 5, wherein said relations of said aZnO, bB$_2$O$_3$, cCuO, and dMnO are 0.5 (wt %) ≦ a ≦ 9.0 (wt %)

0.5 (wt %) ≦ b ≦ 9.0 (wt %)

0.5 (wt %) ≦ c ≦ 6.0 (wt %)

0.1 (wt %) ≦ d ≦ 6.0 (wt %).

18. The dielectric porcelain composition according to claim 5, wherein said relations of said aZnO, bB$_2$O$_3$, cCuO, and dMnO are 1.0 (wt %) ≦ a ≦ 7.0 (wt %)

1.0 (wt %) ≦ b ≦ 7.0 (wt %)

1.0 (wt %) ≦ c ≦ 4.0 (wt %)

0.5 (wt %) ≦ d ≦ 3.0 (wt %).

* * * * *